United States Patent [19]

Burke, Jr., deceased et al.

[11] 4,132,564
[45] Jan. 2, 1979

[54] INTRALEUCOSPHERULOID PIGMENTS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignees: Marion Darrah; Joseph Y. Houghton, both of Pompano Beach, Fla.

[21] Appl. No.: 712,254

[22] Filed: Aug. 6, 1976

[51] Int. Cl.$^2$ .......................... C08K 9/02; C08K 9/04; C08K 9/10
[52] U.S. Cl. .......................... 106/308 M; 106/308 B; 106/308 Q; 106/308 F; 106/308 N; 106/308 S; 106/309; 260/42.14; 260/42.15; 260/42.16; 260/42.53
[58] Field of Search ............... 260/42.53, 42.14, 42.15, 260/42.16; 106/308 M, 309, 308 B, 308 Q, 308 F, 308 N, 308 S

[56] References Cited

U.S. PATENT DOCUMENTS

| | | | |
|---|---|---|---|
| 2,751,369 | 6/1956 | Te Grotenhuis | 260/42.53 |
| 2,786,822 | 3/1957 | Vesce | 260/42.55 |
| 3,133,893 | 5/1964 | Newman | 260/42.21 |
| 3,423,358 | 1/1969 | Burke | 260/42.43 |
| 3,502,582 | 3/1970 | Clemens | 260/42.53 |
| 3,700,690 | 10/1972 | Burke | 260/42.55 |

*Primary Examiner*—James H. Derrington
*Attorney, Agent, or Firm*—Hall & Houghton

[57] ABSTRACT

An intraleucospheruloid pigment and a process for producing the same; the intraleucospheruloid pigment consisting essentially of (a) spheruloids of essentially transparent organic polymer material, preferably cross-linked to essential insolubility in any physical solvent, having primary particles of an average size not exceeding 4 microns in diameter which have embedded therein particulate leuco pigment composition consisting essentially of inorganic opaque white and/or transparent white pigment material having a different refractive index from that of the organic polymer and primary particles of an average size not exceeding 0.2 micron in diameter. In the process for its production, the inorganic pigment material is reduced to an average particle size of 0.2 micron or less, and preferably to between 0.2 to 0.1 micron, and is then included in an emulsion polymerization of monomer material preferably comprising an effective quantity of cross-linking agent, and the polymerization is conducted to produce emulsion polymer of an average particle size not exceeding 4 microns in diameter, having embedded therein the still smaller inorganic pigment particles. Cooperative features are also disclosed.

55 Claims, 5 Drawing Figures

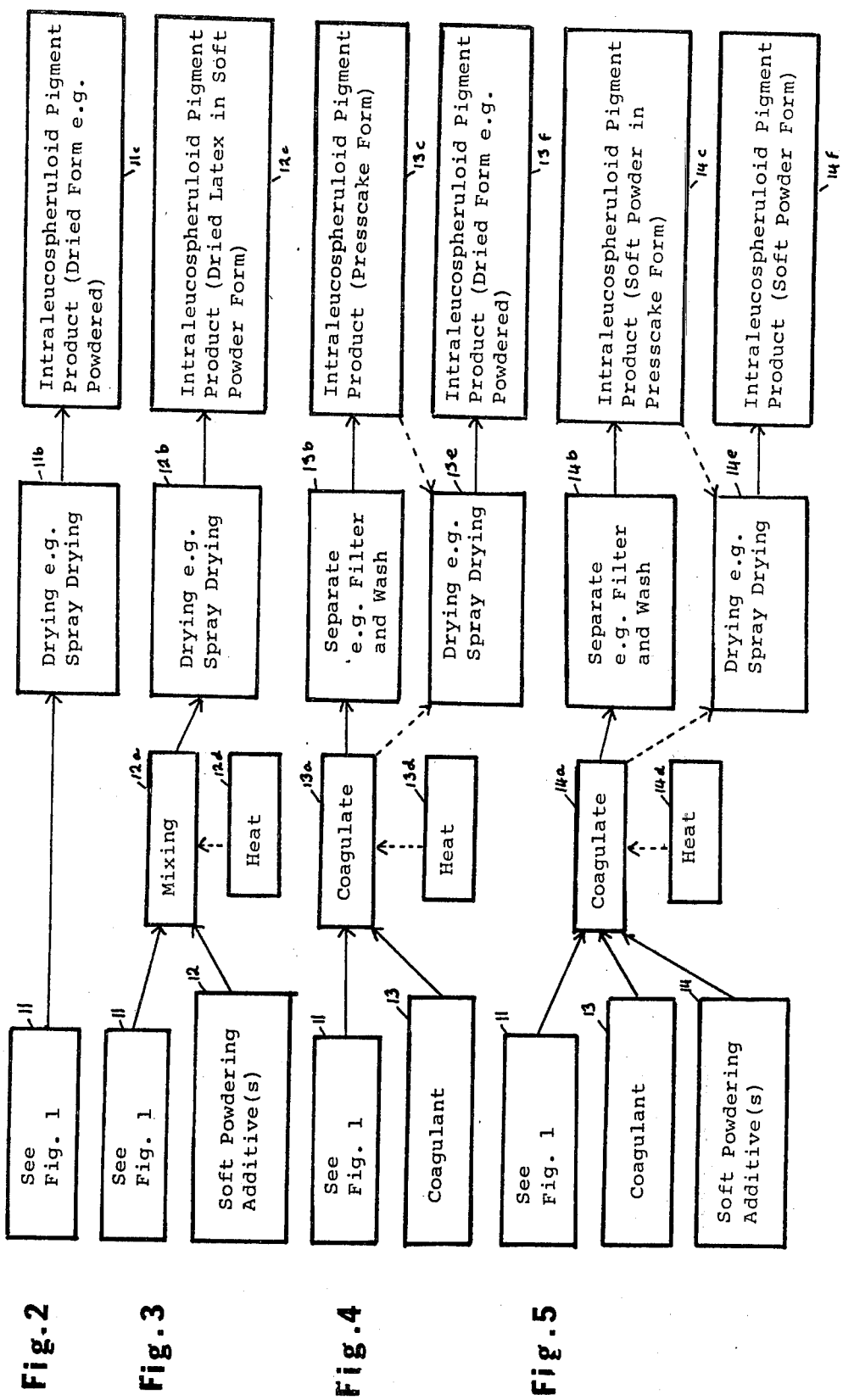

INTRALEUCOSPHERULOID PIGMENTS AND PROCESSES FOR PRODUCING SAME

BACKGROUND OF THE INVENTION

1. Field of the Invention

This invention relates to new white high and low refractive index pigments and aims generally to improve the same and provide novel processes for the production thereof.

2. Description of the Prior Art

In the prior art the so-called white high and low refractive index inorganic pigments, including many of the so-called "Filler" or "Extender" pigments have been subjected to many physical and chemical treatments to render them more attractive to the user both as regards their physical characteristics and also their chemical behavior when incorporated into the system of ultimate usage.

Numerous chemical treatments to modify the surface of such pigments have been tried in order to improve the working and dispersibility characteristics of such inorganic pigments.

Since one of the major uses for such pigmentary material is in the field of modifying or extending colored pigments both organic and inorganic, the fact that the white inorganic pigments are generally inert and difficult to combine with colored pigments or indeed with any vehicle of use without considerable and expensive physical mixing and grinding, the modification of said inorganic pigments to improve such characteristics has been the subject of long and intensive effort on the part of the producers of same. In particular the prevention of reagglomeration of such pigmentary material into hard agglomerates of an average size larger than the normal pigmentary size range of 0.2 to 0.4 micron has never been satisfactorily solved. Many processes and procedures have been attempted, including extensive mechanical working and various surface treatments with oleophilic substances including polymeric compounds but those procedures have involved relative high cost of such treatment, excessive in comparison to the advantages obtained and the low cost of this class of inorganic pigment material as a whole, and such treatments have failed to provide improvement except in certain specific cases within narrow limits of utility. Extensive grinding of inorganic pigments can destroy their utility, inasmuch as their "hiding power" is sharply reduced below certain well defined limits (0.2 micron), and dry grinding thereof is expensive and time consuming as well as presenting a health hazard in the production of considerable quantities of air contaminating dust.

SUMMARY OF THE INVENTION

In the conventional practices above described, the opaque white or transparent white inorganic pigment particles, hereinafter referred to as "Leuco pigment material" which have been employed with average particle size in the light reflecting range, present only their outer faces as light reflectants, the remainder or internal portions of the pigment being useless for pigmentary purpose.

Therefore, such leuco pigments, while relatively inexpensive, have been utilized only with a low degree of efficiency, which has been tolerated largely because of their relative low cost and because of the failure to discover a practical inexpensive way to improve them.

The present invention aims to reduce the inherent inefficiency of the prior art practice by reducing leuco pigment material to particles at or below the conventional size required for optimum light reflectivity and covering power, and then surrounding the individual particles of less than conventional light reflective size with spheruloid bodies of essentially transparent polymer insoluble in the environment of intended use and which differ in refractive index from the leuco pigment and from the environment of intended use so that by light refraction they can enhance to the viewer the apparent size and covering power of the leuco pigment particles. Such novel pigment compositions are hereinafter described and referred to as "Intraleucospheruloid pigments". By this improvement, portions of the leuco pigment previously buried in the interior of said leuco pigment particles of light reflective size are exposed and viewed by refraction in the intraleucospheruloid pigment, thus increasing the hiding power and specular effect of the leuco pigment material employed.

In a preferred embodiment of the invention a process is provided for producing insoluble intraleucospheruloid pigment composition, which process comprises, in combination: (a) providing in liquid medium a particulate pigment composition consisting essentially of inorganic leuco pigment composition dispersed in said medium with 0-100% by weight of the total of surface active agent material set forth in clause (c) of this paragraph, said inorganic leuco pigment composition being essentially insoluble in water and having primary particles of an average size less than 0.2 micron in diameter; (b) forming an aqueous emulsion polymerization system consisting essentially of (1) the composition of (a), (2) the balance, if any, of 100% of the total of surface active agent material set forth in (c), (3) monomer material selected in a ratio of said monomer material to said pigment composition lying in the range of 100:1 to 1:20 by weight, said monomer material consisting essentially of ethylenically unsaturated monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent and (4) emulsion polymerization initiator in an effective amount in the range of 0.2% to 10% by weight of the said monomer material, dispersed in an aqueous medium; (c) the ratio of the total of the surface active agent material present after (b) to said particulate pigment composition lying in the range of 2:1 to 1:40 by weight, and said total of surface active agent material being selected from the class of polymeric and non-polymeric surface active agents and combinations thereof capable of effecting emulsion polymerization in the said system of the selected ethylenically unsaturated monomer material to yield polymer particles with the inorganic pigment provided in step (a) embedded therein; (d) effecting emulsion polymerization in said system at sufficient temperatures in the range of 0 to 200° C. for sufficient time in the range of a few minutes to 24 hours to permit the polymerization to proceed far enough in the range of from 50 to 100% conversion by weight of said monomer material to produce in aqueous dispersion an intraleucospheruloid pigment consisting essentially of spheruloids of organic polymer material, cross-linked to essential insolubility in any physical solvent, having primary particles of an average size not exceeding 4 microns in diameter, and having embedded therein the still smaller size particles of said particulate pigment composition, and (e) recovering said intraleucospheruloid pigment composition.

In this embodiment the monomer material may comprise several portions added sequentially, at least one of the portions comprising cross-linking monomer as set forth and the cross-linking monomer may consist essentially of material copolymerizable with vinyl monomer and may be wholly or partially selected from the unsaturated conjugated drying oils and their acids and derivatives thereof, in the ratio to the vinyl and/or other copolymerizable monomer of 0.2:99.8 to 20:80 by weight.

The product of this preferred embodiment is particularly desirable because we have discovered that it may be modified to be soft powdering as hereinafter disclosed whereas said technique is inapplicable to non-cross-linked oil soluble polymers.

For special purposes and with less general advantage a less preferred embodiment of the invention may be employed wherein the monomer material in step (b) consists essentially of ethylenically unsaturated monomer material selected from the class consisting of monomers polymerizable through a single ethylenically unsaturated group, to produce spheruloids consisting of essentially noncross-linked organic polymer material.

Whether prepared by the preferred or less preferred embodiments the product may be recovered in step (e) in latex form, in presscake form, or in bulk-dried or in spray dried form and may be used in vehicles in which the polymer portion of the product is insoluble, and when, as above noted, the polymer portions of the product are cross-linked to essential insolubility in any physical solvent the products may be recovered in soft powdered form and/or be used in any suitable vehicle.

Thus, as just described, the polymer portion of the intraleucospheruloid pigment of applicant's invention is insoluble in the environment of intended use, and in the preferred practice of the invention is cross-linked to insolubility in all physical solvents, although in certain instances such cross-linking may be omitted with limitation of the special utility of the product to environments in which its polymer portion is essentially insoluble. Further, in accordance with the invention, means are also provided for aiding the fixation of the intraleucospheruloid pigment to the environment of intended use by physical and/or chemical bonding.

We have found it to be essential to reduce the inorganic leuco pigment material to an average particle size essentially below 0.2 micron and preferably of 0.2 to 0.1 micron diameter, which values are well below the optimum pigmentary range commercially available, and that it is then possible to embed such ultra fine inorganic leuco pigment particles within transparent polymer spheruloids insoluble in the environment of intended use, nonfusible at the temperature of intended use, and which differ in refractive index from that of the embedded leuco pigment and from the environment of intended use, and which are of not more than 4 microns average particle size, to thereby obtain the new and useful specular characteristics of the present invention. The reduction in inorganic leuco pigment size to such ultra fineness may be effected by micronizing in liquid medium, e.g. in a ball-mill or preferably a sand-mill. The liquid medium may be an aqueous solution of dispersing agent preferably selected from those known to be suitable for effecting emulsion polymerization, or it may be a liquid body of monomer material with or without such dispersing agent, and with or without a volatile organic diluent miscible with said monomer, the monomer material being suitable for polymerization in the formation of the final product.

The inorganic leuco pigment starting material may be in any conveniently available form, either as wet presscake which may or may not have been subjected to such special treatment as is proprietary to the manufacturer, e.g. surface modification or formation into an aqueous paste; or it may be any dry inorganic pigment composition commercially available, with or without such aforementioned surface modifications.

The polymerization of the monomer or monomers with the inorganic leuco pigment composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intraleucospheruloid pigment having primary particles of an average size not exceeding 4 microns so that the potential hiding power and specular characteristics available may be effectively utilized and retained in the finished product. The necessary dispersant or surface active agent employed in aqueous micronizing of the inorganic leuco pigment material can be as low as is consistent with reduction of the particle size to the desired level and the maintenance of its size stability.

Functional groups may be introduced either into the initial intraleucospheruloid pigment composition by selection of the monomer or monomers or may be later introduced by means of graft polymerization techniques, or by selection of the emulsifier or emulsifiers, particularly those of a polymeric character, which become incorporated with the intraleucospheruloid pigment particles.

In the case where two or more inorganic leuco pigment materials are combined in the spheruloids to produce new and novel specular characteristics, such combinations show little of the loss of refractive index or other specular characteristics associated with normal physical mixtures when two or more inorganic leuco pigments are blended together, but retain the superior characteristics of the superior component to a marked degree.

DESCRIPTION OF PREFERRED EMBODIMENTS

Brief Description of Drawings

In the accompanying drawings illustrative of preferred embodiments of this invention:

FIGS. 2, 3, 4 and 5 are detail flow diagrams of processes for converting intraleucospheruloid pigment in latex form into intraleucospheruloid pigment in other forms such as wet presscake or dry powder.

GENERAL PROCEDURE

Figure 1:
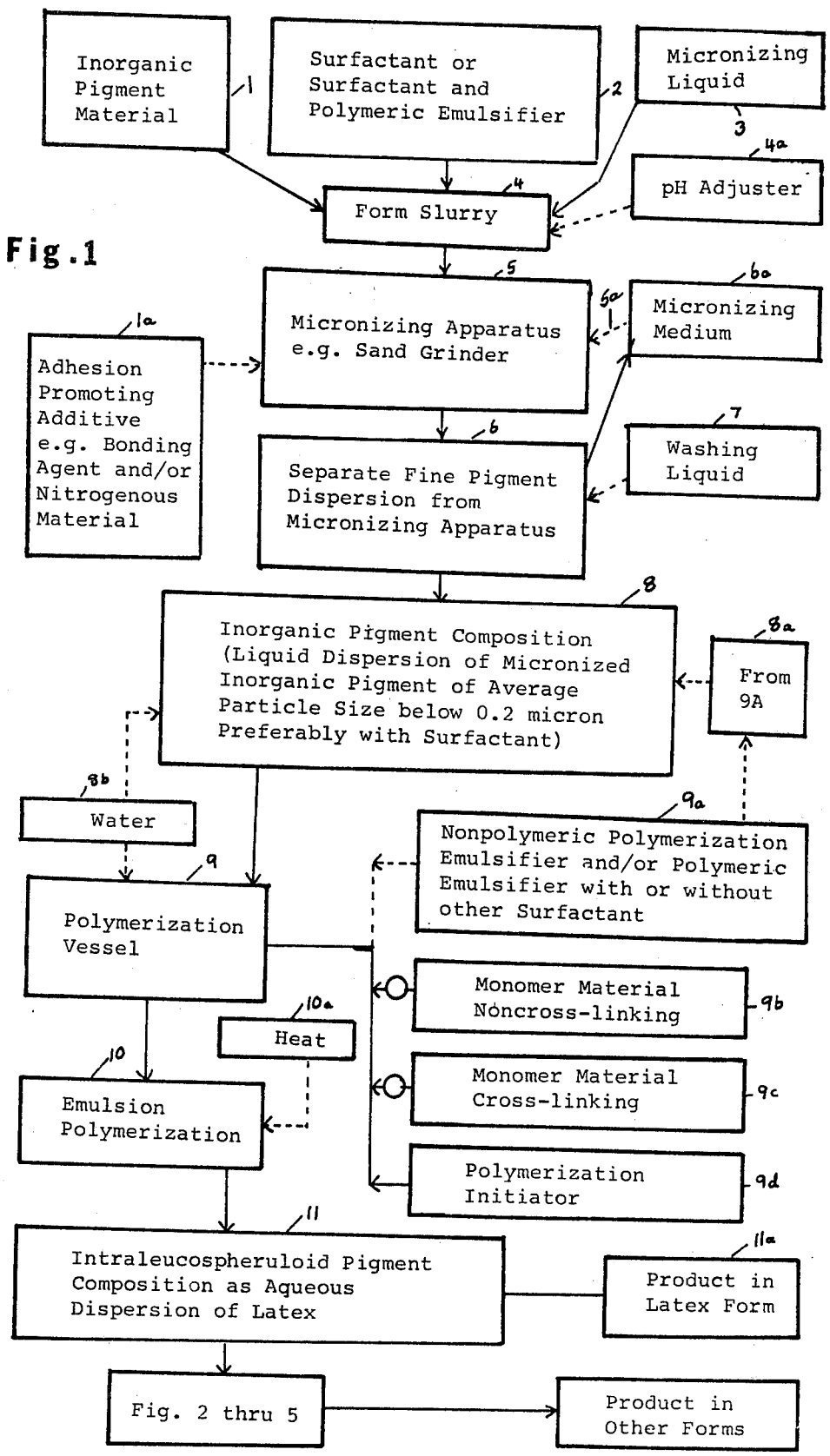
FIG. 1 is a process flow diagram of the procedure for production of intraleucospheruloid pigments in latex and/or other forms.

The general procedures for preparing intraleucospheruloid pigments in accordance with the process of the invention, are illustrated in the drawings. In these procedures (FIG. 1) an inorganic pigment composition 8 is first provided consisting essentially of liquid having dispersed therein micronized inorganic pigment essentially insoluble in the said liquid.

When an aqueous micronizing medium 3 is employed, it comprises surface active agent material 2 which stabilizes the dispersion of the micronized inorganic pigment in said aqueous phase in which the inorganic pigment is so finely divided as to have an average particle size below 0.2 micron. As shown in FIG. 1 the micronizing may be accomplished by charging to a micronizing apparatus 5, e.g. a ball-mill or preferably a sand grinder, a slurry 4 of inorganic pigment material 1 with sufficient water 3 to facilitate the grinding and sufficient surfactant of surface active agent material 2 to stabilize the dispersion to be produced. The charge of slurry 4 is then micronized as at 5 until the pigment particles are so finely divided that the average particulate entities thereof have an average particle size of less than 0.2 micron, and preferably to between 0.2 and 0.1 micron. In this aqueous micronizing procedure the ratio of inorganic pigment material to water to obtain efficient grinding should be in the range of 20:80 to 30:70 and the ratio of surface active agent material to water should be in the range of 5:95 to 20:80 parts by weight or even more. Applicable ratios are subject to variation depending on the particular inorganic pigment material and/or surface active agent material concerned, are not highly critical, and may be optimized empirically.

The separated inorganic pigment material composition 8, with or without added surface active agent material 8a (which may be provided at this stage if desired, especially if the dispersion is to be stored for a substantial time before further processing) is then ready for the next step of the procedure.

When a nonaqueous micronizing medium 3 is employed, the present invention contemplates use as such liquid of a volatile readily removable organic solvent or a part or all of the ethylenically unsaturated monomer material to be employed in the polymerization step 10 with or without added volatile organic solvent miscible with the monomer material and removable prior to the polymerization step. In such instance the amount of surface active agent material 2 employed in the micronizing step 5 can be reduced to zero, or a part or all of the surface active agent or emulsifier to be used in the emulsion polymerization may be present during the micronizing step. Generally the same considerations as to proportions of liquids to solids and empirical practices apply whether the medium be aqueous or nonaqueous. Obviously, when micronizing in flammable material the temperature and the conditions of grinding, such as maintenance of an inert atmosphere and use of explosion-proof electrical equipment, must be controlled in the interests of safety. When it is desirable to employ a wash liquid 7 for removing fine pigment dispersion from the micronizing medium, it is desirable to use a washing liquid which is employed as a component in the polymerization 10. When such a nonaqueous micronizing system is employed the micronized inorganic pigment material 6 is then emulsified in 8 with the aid of water 8b and surface active agent material 8a capable of supporting emulsion polymerization to form an inorganic pigment composition 8 containing therein sufficient inorganic pigment material, surface active agent material, monomer material and water to form an emulsion polymerization composition which is charged to the polymerization vessel 9. Should it be more convenient the necessary water 8b and emulsifier material 8a may be charged directly to the polymerization vessel 9 and the nonaqueous inorganic pigment composition 8 added thereafter.

Preferably in either of the above procedures the degree of micronization is monitored during step 5 by microscopic examination of samples of the micronized slurry to determine when the necessary inorganic pigment particle size has been obtained, at which time the inorganic pigment composition 8 is separated from the micronizing medium 6a, e.g. sand, which may be recycled as at 5a to the micronizing apparatus employed to carry out the micronizing step 5.

During this micronizing step 5 there may also be incorporated if desired additional adhesion or binding agent components 1a, e.g. water soluble alkali metal silicates, aminoplasts, phenoplasts, and their components, water soluble and/or dispersible polymers and the like and/or nitrogenous materials, and/or monomer material, should it be necessary to intimately admix the same during the micronizing step.

In the next step the finely divided pigment entities in said composition 8 are converted into intraleucospheruloid pigment by forming about said inorganic pigment entities bodies of essentially transparent polymer of not over 4 microns in particle size diameter. To accomplish this step the inorganic pigment composition 8 is charged to a polymerization vessel 9 with sufficient surface active agent material 9a (additional to that supplied at 2 or at 8a), if necessary, to provide a total content of surface active agent material appropriate for the emulsion polymerization of monomer material, e.g. 9b, with the aid of an emulsion polymerization initiator 9d, which materials are also charged to the polymerization vessel. Sufficient monomer material is charged so that when polymerized to the desired conversion, usually 100% conversion, the ratio of the inorganic pigment content to the polymer content of the intraleucospheruloid pigment will be in the range of 1:100 to 20:1 (preferably 1:10 to 4:10). As indicated at 10a heat may be supplied to expedite the polymerization 10, as is well known to those skilled in the emulsion polymerization art.

By such procedures the conversion step (b) produces from the micronized inorganic pigment material and monomer material supplied, an essentially stable aqueous dispersion, i.e. latex, of intraleucospheruloid pigment 11.

This dispersion 11 may be withdrawn as product 11a, for use as an intraleucospheruloid pigment latex in opacifying of water base paints and inks, opacification of paper in the beater, used as a base for laking on coloration with organic and inorganic dyes and pigments and other uses for which a stable high refractive index leuco pigment is adapted, or as indicated in FIG. 1 it may be further processed to produce intraleucospheruloid pigment in other forms illustrated in FIGS. 2 to 5.

For example as shown in FIG. 2, the intraleucospheruloid pigment latex or dispersion 11 may be converted to a dry powdered product 11c by drying, preferably spray drying, as shown at 11b. When spray drying is employed the latex or dispersion being dried may be reduced to a very fine spray in order to obtain a finely divided spray dried product without additional processing.

When cross-linked, the need for a spray drying procedure may be reduced as shown in FIG. 3 by intimately mixing with the intraleucospheruloid pigment latex 11, as at 12a, soft powdering additive(s) 12, with or without the aid of heat 12d, and drying this mixture, which will produce the intraleucospheruloid pigment in dried latex soft powder form 12c, requiring little or no mechanical attrition to constitute a useful powdered product. These dried intraleucospheruloid pigment products 11c and 12c are more readily shipped and stored than the intraleucospheruloid pigment latex and may be employed for the same purposes as above set forth in connection with intraleucospheruloid pigment latex 11c.

As shown in FIG. 4 instead of drying the intraleucospheruloid pigment latex directly as in FIGS. 2 and 3, the intraleucospheruloid pigment latex or dispersion may be coagulated as at 13a with the aid of a coagulant 13 with or without the aid of heat 13d, and the coagulum of intraleucospheruloid pigment may then be separated from the serum as at 13b e.g. by centrifuging or filtering and washing, to produce the intraleucospheruloid pigment in wet presscake form 13c. Such wet presscake form has advantages for certain uses where a product is required that is substantially free of surface active agent material and excess water, e.g. as in the flushed color industry, and may also be used for the same purposes as the intraleucospheruloid pigment latex or dispersion 11 or the dried surface active agent material-containing intraleucospheruloid pigment powders 11c and 12c. The coagulated intraleucospheruloid pigment material 13a, which may have its characteristics modified by the coagulant and/or any other modifier which may be present therein, can itself be dried as indicated by the dotted arrow leading from 13a to 13e in FIG. 4, or where a dry intraleucospheruloid pigment essentially free of surface active agent material and/or coagulant material residues is preferred, the intraleucospheruloid pigment presscake 13c may be dried as indicated by the solid arrow leading from 13c to 13e for producing such form of product 13f.

The procedure of FIG. 4 may be modified as shown in FIG. 5, by adding to the cross-linked pigment latex or dispersion 11 not only coagulant material 13, but also soft powdering additive(s) 14, which may be introduced either before or after the coagulation is effected at 14a (with or without the aid of heat 14d). The so modified coagulated intraleucospheruloid pigment dispersion may then be treated in the same manner as described in connection with items 13b, 13c, 13e and 13f as indicated by the respectively corresponding items 14b, 14c, 14e and 14f in FIG. 5 and the modified products 14c and 14f include the soft powder advantages described in connection with FIG. 3.

Such dry intraleucospheruloid pigments are especially suitable for incorporation into nonaqueous systems, especially oil based paint and printing inks, and the opacifying and hue modification of thermoplastic compounds. For clarity in the following more detailed description and exemplification of the invention certain terms will be employed, the meaning of which we here set forth:

(1) Inorganic Pigments

The term "inorganic pigments" and "inorganic pigment material" as used herein designates the inorganic pigmentary materials both natural and manufactured in origin which are usually described as white or "opaque white pigments". It also includes for the purposes herein the semi-opaque white pigments or "transparent white pigments" or "extender or filler pigments".

The invention is generally applicable to such inorganic pigments and is not limited to the use of any particular inorganic pigment or pigments. As illustrative but not restrictive of those that may be used and improved by this invention are the opaque white and transparent white pigments such as are referred to in the Handbook of Chemistry and Physics, Weast, 55th Edition 1974-1975, CRC Press; herein incorporated by reference; in the 3rd Edition (1973) of "The Color Index", Volume 3 published jointly by the "British Society of Dyers and Colourists" and the "American Association of Textile Chemists and Colorists", herein incorporated by reference; and in Volume 1 of "The Pigment Handbook", published by John Wiley and Sons 1973, edited by Temple C. Patton, also herein incorporated by reference.

Among the most useful of the inorganic pigments, may be listed, but not restrictively, the siliceous pigments including the natural silica pigments, the precipitated silica pigments, the pyrogenic silica pigments, the alkaline-earth silicate pigments, the aluminum silicate pigments, the zinc silicate pigments, the zirconium silicate pigments; the titanium dioxide pigments and pigment compositions; alkaline-earth carbonate and sulfate pigments, the alumina and hydrated aluminum oxide pigments, zirconium oxide pigments and combinations of any two or more of such pigments. Typical representatives of these inorganic pigments are set forth in the examples by way of illustration.

(2) Surface Active Agent Material

Among the dispersing and/or emulsifying agents available for use as surface active agents herein we have found that the only essential criterion for such agent is that it, or it in combination with one or more additional dispersants and/or emulsifiers which may be used, should be capable of supporting emulsion polymerization. Having regard to this criterion surface active agents or as they are more generally classified "surfactants" (which encompasses both grinding, wetting and emulsifying agents) may be either anionic, nonionic, cationic or amphoteric; of either singular molecular structure or polymeric nature; it being understood that when two or more of such agents are employed together they must be compatible with each other. For example non-polymeric or polymeric anionic surfactants may be combined with each other and with nonionic and/or amphoteric surfactants, polymeric or nonpolymeric; and nonpolymeric or polymeric cationic surfactants may be combined with each other or with nonionic and/or amphoteric surfactants; and amphoteric and/or nonionic surfactants may be combined with each other. Thus it is possible to use a very wide range of commercially available surface active agents for achieving the degrees of grinding, the emulsion polymerization, and the production of intraleucospheruloid pigments as latices suitable for particular uses, as hereinafter exemplified, comprehensive listings of which are set out in the treatises "Detergents and Emulsifiers 1974 Annual" by John W. McCutcheon, published by John W. McCutcheon, Inc., Morristown, New Jersey, especially under the headings of Emulsifiers Suitable for Emulsion Polymerization, etc., and "Surface Active Agents and Detergents" by Anthony N. Schwartz et al, Interscience Publishers, Inc., New York (1958), Vol. 2, pages 153-172, each of which is herein incorporated by reference.

Among the commercially available surfactants may be mentioned the anionic surfactants, e.g. carboxylic acids and their derivatives, sulfonic esters, alkanesulfonates, alkylaryl sulfonates and phosphate esters; the nonionic surfactants e.g. polyethenoxy ethers of alkylphenols, polyethenoxy ethers of alcohols and mercaptans, difunctional and poly-functional polyethenoxy esters, miscellaneous polyethenoxy esters, polyethenoxy compounds with amide and miscellaneous linkages and various polyhydroxy compounds; the cationic surfactants, e.g. the straight chain alkyl ammonium compounds, the cyclic alkylammonium compounds, the olefin derived compounds, and the quaternary compounds derived from the same; the amphoteric surfactants e.g. those derived from betaines and phenolic substances; and the polymeric surface active agents set out in the said McCutcheon and Schwartz et al treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants, for both the micronizing steps and the emulsion polymerization steps. Typical of these fluorocarbon surfactants are the "Zonyl" trade-marked fluorocarbon surfactants of the DuPont Company, such as Zonyl A or P (anionic), Zonyl C (cationic), Zonyl N (nonionic), and Zonyl B (amphoteric).

(3) Micronizing

The term "micronizing" as used herein connotes the physical reduction in particle size in liquid medium of the inorganic pigment materials by means of an appropriate grinding system, e.g. a ball-mill or a sand-mill, to the particle size desired in the step concerned, with the aid of a surface active system if needed to assist the grinding and inhibit agglomeration of the micronized particles into aggregate particles of larger size. Both ball-mills and sand-mills or sand grinders are well known to the pigment art and commercially available. The balls in the case of a ball-mill, or the sand or like grinding material in the case of the sand-mill, are herein termed micronizing media.

(4) Monomer Materials

The monomer materials which may be used in practicing the present invention are the monomer compounds containing an emulsion polymerizable through one or more ethylenically unsaturated $>C=C<$ groups to form homopolymers, copolymers or grafted polymers to constitute the essentially transparent particles formed about the individual pigment entities herein.

Such compounds containing and polymerizable through a single one of such groups produce linear polymers unless copolymerized with cross-linking monomer, i.e. monomer containing a plurality of such groups which category for the purpose of this invention, includes not only polyvinyl, polyalkyl and vinyl-allyl monomers but also the drying oil substances emulsion copolymerizable with other ethylenically unsaturated compounds.

The polymer bodies embedding the pigment particles in accordance with this invention preferably are cross-linked to insolubility in all physical solvents, but with less advantage may be insoluble only in the intended environment of use. With these criteria for guidance, the monomer materials and emulsion polymerization procedures employable may be selected by one skilled in the art from any of those available. The fact of cross-linking to insolubility in all physical solvents enhances the utility in that it also renders the cross-linked particles infusible thus making the cross-linked material useable in any type of thermoplastic material.

Among the mono-ethylenically unsaturated monomers available for preparation of the improved pigment composition are monovinyl aromatic compounds such as styrene, the methyl styrenes, the ethyl styrenes, the dimethyl styrenes, the diethyl styrenes, the isopropyl styrenes and mixed alkyl styrenes; nuclear substituted vinyl aryl compounds where the substitution is alkyl, aryl alkyl, aralkyl, cycloalkyl, alkoxy, aryloxy, chloro, fluoro, chloromethyl, fluoromethyl and trifluoromethyl nuclear derivatives; halogenated derivatives of these various aromatic vinyl compounds such as the mono and dichloro styrenes; the alkyl substituted mono and dichloro styrenes; the vinyl napthalenes, e.g. methyl vinyl naphthalene and their halogenated derivatives; the vinyl aryl acids and vinyl alkyl acids such as acrylic acid and the alpha-alkyl substituted acrylic acids such as methacrylic acid, and esters of such acids as glycidyl, methyl, ethyl, propyl, butyl, isobutyl and other esters of aliphatic alcohols; the amides of acrylic and methacrylic acid and derivatives thereof such as the methacrylamides, acrylamides, N-methylacrylamides, N-N-diethylacrylamide, N-ethylmethacrylamide, N-N-dimethylmethacrylamide, etc.; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl-chloro maleate; the unsaturated ketones, methyl vinyl ketone and methyl isopropenyl ketone; the vinyl pyridines; the vinyl quinolines; vinyl furans; vinyl carbazoles, the esters of vinyl alcohols such as vinyl acetate; acetylamino substituted acrylic and methacrylic acids, and their esters, methyl, ethyl, propyl- and the like such as α-acetaminoacrylate and the α-n-butyraminoacrylates, etc.; the ethers of olefinic alcohols especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl trichloride, vinylidene chloride, 1-chloro-1-fluoro ethylene and 4-chlorobutene-1; and the vinylidines.

Among the cross-linking or polyethylenically unsaturated monomers which may be used alone or in combination with other emulsion polymerizable ethylenically unsaturated compounds, are the polyvinyl, polyallyl and vinyl-allyl compounds such as polyvinyl aromatic compounds, for example divinylbenzene, divinyltoluene, divinylxyline, divinylethylbenzene, trivinylbenzene, divinylnapthalene, divinylmethylnapthalenes; the vinyl esters, allyl esters and vinyl allyl esters of carboxylic and polycarboxylic acids including polymerizable ester monomers such as diallyl maleate, vinylcrotonate, allyl methacrylate, allyl acrylate, ethylene glycol dimethacrylate, divinylsuccinate, divinyladipate, vinylacrylate, vinylmethacrylate; and drying oil substances. The copolymerizable "drying oils" which may be used as cross-linking agents include the unsaturated vegetable oils and the unsaturated fish oils which oils are capable of forming films by oxidation on exposure to air and further includes these oils in their new state, in bodied form and/or otherwise modified, as by air blowing. The term "drying oil substances" includes (1) the drying oils, especially those containing conjugated unsaturation e.g., tung oil, oiticica oil, isano oil, conjugated linseed oil, conjugated soya bean oils, fish oil, etc., (2)

the air blown or bodied drying oils, whether from conjugated or nonconjugated drying oils and whether bodied by heat and/or catalytically, (3) the fatty acids including their dimers, trimers and tetramers derived from such drying or modified drying oils.

In preparing modified improved intrachromospheruloid pigment compositions by graft polymerization techniques, active sites may be provided by grafting with monomers such as butadiene, isoprene, piperyline, methyl pentadiene and/or other hydrocarbon dienes and also the polar dienes such as chloroprene and cyanobutadiene.

(5) Polymerization Initiator

Examples of suitable emulsion polymerization catalysts or initiators that may be used include water soluble catalysts such as the perborates, persulfates and perchlorates of potassium sodium and ammonia; which may be used with or without small amounts of heavy metal salts such as those of iron, cobalt, etc., with or without a reducing agent such as sodium bisulfite or metabisulfite, or the catalyst may be an inorganic peroxide such as barium peroxide, sodium peroxide, hydrogen peroxide; an aliphatic acyl peroxide such as acetyl peroxide, lauryl peroxide, stearyl peroxide; an aromatic acyl peroxide such as benzoyl peroxide, or phthaloyl peroxide; a mixed peroxide such as acetyl benzoyl peroxide, acetyl stearyl peroxide; organic aliphatic and aromatic azo compounds such as azobisisobutyronitrile and certain azo dye structures; or it may be a hydroperoxide such as cumene hydroperoxide or diisopropylbenzene hydroperoxide which is often used with a reducing agent such as tetraethylene pentamine and ferrous sulfate as a source of iron with sodium or potassium pyrophosphate to complex the iron.

Heat or radiation may also serve to initiate or facilitate emulsion polymerization.

A mercaptan such as dodecylmercaptan may sometimes be used in small amounts as a polymerization initiator, whereas in larger amounts it serves as a polymerization modifier; or aluminum salts such as the halides; organic and inorganic acids; metal compounds of the unsaturated acids such as cobalt and manganese resinates, linoleates and maleates may be used. The catalyst system chosen is only important insofar as it affects the rate of the polymerization reaction, always taking into account that the system chosen must not react unfavorably with the pigment or pigments being used.

(6) pH Adjustment

By pH adjustment is meant the addition of either acid or base to adjust the pH for micronizing to within the desired range which may be most efficient for the purpose in question, e.g. to be compatible with the pigmentary, monomeric, and/or surfactant materials being used. Preferred additives are the organic acids such as acetic, formic, hydroxyacetic to lower the pH, and ammonium hydroxide to raise the pH. Inorganic acids and/or bases may be used provided they do not form objectionable amounts of salts which would interfere with the process or attack the equipment being used.

(7) Polymerization Vessel

By polymerization vessel is meant any suitable vessel equipped with the necessary mechanical stirrer, temperature controls, and apertures for addition of reactants prior and during the polymerization step, constructed of suitable materials such as stainless steel or preferably glass lined to avoid contamination of the polymerization ingredients.

(8) Emulsion Polymerization

By the term emulsion polymerization is meant the polymerization in aqueous medium of polymerizable ethylenically unsaturated monomer or monomers, linear or cross-linking in nature, in such a manner that the polymer formed is in such a finely divided form that it remains suspended as particles having Brownian movement.

(9) Intraleucospheruloid Pigment

The term "intraleucospheruloid pigment" as used herein designates spheruloids of essentially transparent polymer material, preferably cross-linked to essential insolubility in all physical solvents, and of an average particle size of not more than 4 microns, having embedded therein still smaller particles of inorganic pigment. The transparent spheruloids of preferably cross-linked polymer, in any medium in which they are insoluble, preserve the attained particle size of the embedded inorganic pigment material and enhance the specular and refractive characteristics of the same, thus providing a new and useful inorganic pigment composition.

(10) Latex

By the term latex is meant the aqueous dispersion of the intraleucospheruloid pigment composition in which the intraleucospheruloid pigment particles are so small that they are essentially non-settling, i.e. maintained in suspension by Brownian movement.

(11) Soft Powdering Agent(s)

The term soft powdering agent(s) or additive(s) as used herein connotes materials selected from the class consisting of aliphatic, cycloaliphatic and aromatic hydrocarbons and their alcohols having boiling points between 90° C. and 200° C. preferably the predominantly aliphatic hydrocarbon solvents of this class such as Solvent Naphtha, and Stoddard Solvent. Naphtha Solvent, or Solvent Naphtha is a mixture of low boiling hydrocarbons having a boiling point range of 90°–165° C. obtained in the distillation of coal tar, petroleum or shale oil, and may contain appreciable portions of benzene or its homologues. Stoddard Solvent is a petroleum distillate with a minimum flash point of 100° F. 90% distillable at 375° F. with an end point of 410° F.

In accordance with this invention, said hydrocarbon materials are preferably applied in conjunction with an oil soluble surface active agent. The oil-soluble surface active agent is selected from that class of materials extensively defined by Schwartz, Perry and Berch in their book "Surface Active Agents and Detergents", Vol. II, Interscience Publishers, Inc., New York (1958), especially at pages 244–247 and pages 597–605, herein incorporated by reference. Such useful surface active agents include the dialkyl sulfosuccinates, the mahogany sulfonates, long chain (16–18 carbon atoms) alkyl aromatic sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan and polyethenoxy sorbitan nonionics.

(12) Soft Powder Products

The term "soft powder" or "soft powdered" intraleucospheruloid pigment as applied to products producible by the present invention connotes the physical characteristic resulting from the treatment herein disclosed of the aqueously wet, never previously dried, cross-linked insoluble intraleucospheruloid pigment with the aforesaid soft powdering agents before drying the same to a dry pigment product, i.e. the characteristic that the soft powdered dried product has such a soft form that it is in, or readily reduced to, a fine soft powder without any extended attrition, thereby being more readily dispersible in any medium than the same product not so treated. The mechanism accounting for this characteristic is not clearly understood, but it is believed that the hydrocarbon components of the soft powdering additives, which are carried on to the surfaces of the intraleucospheruloid pigment particles by means of the oil soluble surfactant components thereof subsequently removed in the wash water, inhibit hydrogen bridging between the intraleucospheruloid pigment particles by occupying the sites at which such could occur until after the elimination from the system of the aqueous phase, and thereafter are substantially removable at a more elevated temperature when their presence is not desired in the soft powdered product.

(13) Coagulant

By coagulant we mean any additive capable of destabilizing the emulsified system under consideration, for causing coagulation of its solids content; the coagulant used will of course vary depending largely on the type of system, i.e. the type of surfactant used and/or the functionality, if any, of the intraleucospheruloid polymer. For example, anionic systems may be coagulated with either acids such as acetic or formic, hydrochloric, sulfuric, alkaline-earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amines thereof, and ammonium hydroxide or water soluble alcohols. Nonionic systems are often coagulated with water soluble alcohols with or without the addition of acids. Anionic latices of intraleucospheruloid pigment may also be coagulated by combining therewith cationic latices or substrate material surfaced with cationic polymer, and vice versa.

(14) Pigment Bonding Agents

The inorganic pigment material may be modified either physically or chemically by the addition or incorporation of modifying agent material during either the micronizing or polymerization steps or both.

Pigment bonding agents which may be used to aid fixation of the inorganic pigment to organic polymeric material may be inorganic, e.g. a water soluble alkali metal silicate or a water soluble titanium compound for example, titanium tetrachloride or oxychloride. Alternatively they may be organic, e.g. an aqueous dispersion of a water soluble organic condensation resin such as an aminoplast or a phenoplast, which may be formed in situ by sequential addition of aqueous solutions or reactants for forming such resins. By reactants which form aminoplastics or aminoplasts we mean urea, melamine, thiourea and guanidine, etc., condensed with formaldehyde, glyoxal, etc. By reactants to form phenoplasts we mean phenol and/or substituted phenolic alcohols such as the cresols, xylenols and/or resorcinol, etc., condensable with formaldehyde and/or higher aldehydes such as glyoxal or furfural, etc. We use the term phenoplast in the same manner as used by T. S. Carswell in his book entitled "Phenoplasts. Their Structure, Properties and Chemical Technology," published in 1947 by Interscience Publishers, Inc., New York, N.Y. We use the term aminoplastics in the same manner that C. P. Vale uses this term in his book entitled "Aminoplastics," published in 1950 by Cleaver-Hume Press, Ltd., London, England.

Or a bonding agent may be ethylenically unsaturated monomeric material to be absorbed and/or adsorbed by the inorganic material during the micronizing step, and then polymerizing said added monomer material with the aid of a polymerization initiator.

Also the water soluble organo-silane compounds, e.g. Z6020 Silane available from Dow Chemical Company may be used.

Bonding agents which may be used to aid the substantivity of the inorganic to the organic phase of the intraleucospheruloid pigments by chemical bonding include aqueous solutions or dispersions of organic polymers depositable on the inorganic pigment material and containing carboxy, amine, sulfate, and/or sulfonic acid groups, salts thereof, nitrogenous containing material such as oleophilic amines, oleophilic imines, oleophilic amine carboxylates, oleophilic quaternary ammonium compounds, water soluble polyamines, water soluble imines and combinations thereof may also be used.

(15) Pigment Modifying Agent

The inorganic pigment material and/or intraleucospheruloid pigment material may be modified either physically or chemically by the addition or incorporation of modifying material during or following the micronizing step. For example the modifier may be a bonding agent to aid in bonding the inorganic pigment particles to the monomer spheruloids, or to aid the fixation of the intraleucospheruloid material to a substrate material. The modifying agent may comprise one or more of these substances or compounds which can be employed although not essential to the process, to obtain certain specific advantages or modifications to the process or products thereof. Such substances may include nitrogenous material such as water soluble or insoluble amines, imines and polyamines and polyimines, added to the inorganic pigment material during the micronizing step to render it more oleophilic, and/or water soluble or dispersible condensation resin products or the components thereof, added during the micronizing or subsequent steps.

(16) Separation by Screening

Separation by screening or conventional screening when employed in the Examples herein, connotes that the micronized inorganic pigment is washed away from the micronizing medium and the screen with diluting liquid or a part thereof.

(17) 50% Divinylbenzene

The term 50% divinylbenzene as used herein denotes the commercially available product regarded as an approximately equal mixture of divinyl and mono-vinyl materials.

(18) Microscopic Examination

The term microscopic examination as used in the Examples hereinafter denotes examination with an optical microscope, i.e. a Leitz "Ortholux" research microscope, which is regarded as having a resolving power of 0.2 micron and a lower limit of visibility for well separated particles of 0.02 micron diameter, and average particle sizes herein set forth were determined accordingly.

DETAILED DESCRIPTION

Bearing in mind the foregoing, examples are herein set forth illustrative but not restrictive of the invention, and of the best modes known to applicants for practicing the same, the first group of Examples A–F setting forth detailed procedures for the preparation of less preferred embodiments of the invention in latex or dispersed form; the second group of Examples G–M setting forth detailed procedures for preparation of preferred embodiments of the invention in latex or dispersed form; the tabulated Examples of Tables 1–7 further exemplifying the preferred mode of practicing the invention for producing the product in latex or dispersed form; the Examples of Tables 8–14 further exemplifying the less preferred modes of practicing the invention for producing a latex or dispersed product; and Examples 1 et seq. illustrating modification and variants of the preceding Examples.

EXAMPLES A–F

Production of Various Noncross-linked Intraleucospheruloid Pigment Compositions (Typical Procedural Examples)

Example A (Containing nitrogenous material as inorganic pigment bonding agent).

Charge 50 grams of Rutile type Titanium Dioxide pigment (TiPure R 900 — DuPont) to a sand grinding apparatus together with 200 ml. of water, 1 gram of a nitrogenous material such as Monoquat TIBC (substituted imidazoline quaternized with benzyl chloride) 5 grams of Tamol 731 (sodium salt of a polymeric carboxylic acid) and 20 grams of Alipal CO 433 (sodium salt of a sulfate ester of an alkylphenoxy poly(ethyleneoxy) ethanol and sufficient grinding medium such as Ottawa sand to ensure efficient grinding. Mill the charge until a representative sample on microscopic examination shows that on the average the inorganic pigment particles are below 0.2 micron in diameter and essentially all between 0.2 and 0.1 micron in diameter. The charge is separated from the grinding medium by conventional means e.g. screening and the organic pigment dispersion is charged to a polymerization vessel equipped for emulsion polymerization and adjusted to four hundred cc. volume with water. The apparatus is purged with nitrogen and a monomer mixture consisting of forty grams of styrene, 5 grams of 4-vinylpyridine, having 1 gram of azobisisobutyronitrile dissolved therein is added together with 10 cc. of 28% ammonium hydroxide solution to adjust the pH of the charge to about 10–10.5. The system is purged with nitrogen and the temperature of the reaction vessel raised to 75°–80° C. and held there with agitation for 4 to 5 hours. On cooling, an intraleucospheruloid pigment is obtained which under microscopic examination shows essentially all of its primary particles to be composed of spheruloids between 0.5 and 1 micron in diameter. The product may be used in its aqueous dispersion form or may be isolated by coagulation either with an alcohol, or by addition of an acidic intraleucospheruloid pigment such as is produced in Example D and contains functional basic groups thereon.

Example B (Nonionic emulsifier)

Charge 100 grams of a Titanium Dioxide rutile pigment (TiPure R 900 — DuPont) to a sand grinding apparatus together with 300 cc. of water, 2 grams of a sodium salt of a condensed naphthalene sulfonic acid and 5 grams of a sodium salt of a polymeric carboxylic acid (Tamol 731), and sufficient grinding medium such as Ottawa sand to ensure efficient grinding. Mill the charge two hours and then add 72 grams of 28% "N" sodium silicate solution (equivalent to 20 grams $SiO_2$). Continue grinding until a representative sample under microscopic examination shows essentially all of the inorganic Titanium Dioxide particles below 0.2 micron in size. Separate the inorganic pigment composition from the grinding medium by conventional means e.g. screening and charge to a vessel equipped for emulsion polymerization together with 100 parts of an octylphenoxy polyethoxy ethanol 70% active (Triton X 405) 10 to 15 parts of 28% ammonium hydroxide solution to adjust the pH to 10–11 and sufficient water to adjust the volume of the charge to 700 cc. Purge the system with nitrogen and add 100 grams of a solution of monomer consisting of 92 grams of styrene, 8 grams of dimethylaminoethylmethacrylate containing 3 grams of azobisisobutyronitrile dissolved therein. Heat the reaction vessel to 70°–75° C. with agitation and maintain at that temperature for 7 to 8 hours. On cooling an intraleucospheruloid pigment is obtained which under microscopic examination shows essentially all of its primary particles to be composed of spheruloids below 2 microns in size with no evidence of any free polymer.

Example C (Cationic emulsifier)

The procedure of Example B is followed with the exception that in place of the Triton X 405 is used 100 grams of Triton X 400 (stearyl dimethyl benzyl ammonium chloride 82% active) and the pH of the polymerization is adjusted to below 4 and 5 with 10 grams of glacial acetic acid.

Example D (Intraleucospheruloid pigment with basic groups)

Charge 100 grams of a Titanium Dioxide pigment slurry containing 60 grams solids (TiPure LW slurry — DuPont) to a sand grinding apparatus together with 20 parts of glacial acetic acid and 25 parts of N-tallow trimethylene diamine (Duomeen T). Add 300 parts of water and sufficient grinding medium such as Ottawa sand to ensure efficient grinding. Mill the charge until a representative sample under microscopic examination shows that essentially all the particles thereof are below 0.1 micron in diameter. After separation from the grinding medium, e.g. by conventional screening, the inorganic pigment dispersion is charged to a polymerization vessel equipped for emulsion polymerization and the volume adjusted to 600 cc. with additional water as required. Purge the system with nitrogen and add a mixture of 45 grams of styrene, 5 grams of dimethylaminoethylmethacrylate, 10 grams of 4 vinylpyridine, said monomer mixture containing one and a half grams of azobisisobutyronitrile dissolved therein. Heat the reaction vessel to 75°–80° C. and maintain at this temperature for five hours under agitation. On cooling an intraleucospheruloid pigment is obtained which under microscopic examination shows essentially all its primary particles to be composed of spheruloids below 2 microns in size. The product may be used as is as a wet dispersion, or it may be isolated by the addition of a coagulating agent such as alcohol or a base such as sodium hydroxide, filtered, washed and dried to yield 120 grams of a dry powder product. This intraleucospheruloid pigment by virtue of the monomers used, possesses funtional basic groups thereon, capable of reacting with acidic material e.g. acid dyes to form color lakes.

Example E (Monomer material co-ground with inorganic pigment as bonding agent therefor)

The procedure of Example B is followed except that the dimethylaminoethylmethacrylate is incorporated in the grinding step and the grinding is continued until a representative sample under microscopic examination shows essentially all of the inorganic pigment particles between 0.2 and 0.1 micron in diameter.

Example F (Grinding pigment with monomer present)

The procedure of Example E is followed except that in place of the dimethylaminoethylmethacrylate is substituted acrylic acid and the grinding is continued until a representative sample under microscopic examination shows essentially all of the inorganic pigment particles below 0.2 micron in diameter.

EXAMPLES G–M

Production of Various Cross-linked Essentially Insoluble Intraleucospheruloid Pigments (Typical Procedural Examples)

Example G (Nitrogeneous modified pigment/acidic spheruloids)

The procedure as set forth in Example A is followed with the exception that the monomer material used consists of a mixture of 40 grams of styrene, 5 grams of 50% divinylbenzene and 5 grams of methacrylic acid; the whole containing 1 gram of azobisisobutyronitrile dissolved therein. The product contains acidic functional groups and is cross-linked to essential insolubility in any physical solvent by virtue of the incorporation of a bifunctional monomer material (divinylbenzene) in the polymerization and is also infusible.

Example H (Titanium and silicon dioxides co-ground)

Charge 100 grams of a Titanium Dioxide pigment (Unitane OR 450) to a ball-mill together with 20 parts of a precipitated silica pigment such as HiSil 404, 10 grams of Duomac T (N-tallow trimethylene diamine diacetate 85% active), 40 grams of Triton X 405 (octylphenoxy polyethoxy ethanol 70% active) 10 grams of glacial acetic acid and sufficient water to adjust the volume of the charge to about 500 ml. Mill the charge until a representative sample under microscopic examination shows essentially all of the Titanium Dioxide pigment particles to be between 0.2 micron and 0.1 micron in diameter and the silica pigment particles to be essentially below 0.2 micron in diameter. Separate the charge of dispersed inorganic pigment composition by conventional means e.g. screening, and charge to a reaction vessel equipped for emulsion polymerization. Flush the system with nitrogen and add a premixed monomer solution containing 100 grams of styrene, 20 grams of 50% divinyl benzene, 10 grams of dimethylaminoethylmethacrylate, 1 gram of Oiticica oil and 4 grams of azobisisobutyronitrile. Heat the reaction vessel to 80° C. and maintain at this temperature with agitation for seven hours. On cooling an intraleucospheruloid pigment composition is obtained which on microscopic examination shows essentially all of its primary spheruloid particles to be below 2 microns in diameter with no evidence of separation of any of the components into individual unincorporated entities.

Example I (Grinding with polyethylenimine)

The procedure of Example H is followed with the exception that the Titanium Dioxide pigment is ground until the average particle size under microscopic examination is below 0.1 micron, with 10 grams of PEI 600 (polyethylenimine) in the micronizing liquid.

Example J (Inorganic pigments co-ground with acidic monomer present

Charge 100 grams of a Titanium Dioxide pigment (Unitane OR 450) to a sand-mill together with 20 parts of a precipitated silica pigment such as Silene D, 40 grams of Triton X 405 (octylphenoxy polyethoxy ethanol 70% active) 10 grams of 28% ammonium hydroxide and 10 grams of acrylic acid and sufficient water to adjust the volume of the charge to about 500 ml. Mill the charge until a representative sample under microscopic examination shows essentially all of the Titanium Dioxide pigment particles to be between 0.2 and 0.1 micron in diameter and the silica pigment particles to be essentially below 0.2 micron in diameter. Separate the charge of dispersed inorganic pigment composition by conventional means e.g. screening, and charge to a reaction vessel equipped for emulsion polymerization. Flush the system with nitrogen and add a premixed monomer solution containing 100 grams of styrene, 20 grams of 50% divinylbenzene, 1 gram of Tung Oil and 4 grams of azobisisobutyronitrile. Heat the reaction vessel to 75°–80° C. and maintain at this temperature with agitation for 6 hours. On cooling an intraleucospheruloid pigment composition is obtained which on microscopic examination shows essentially all of its primary spheruloid particles to be below 2 microns in diameter with no evidence of separation of any of the components into individual unincorporated entities.

Example K (micronizing in nonaqueous solvent)

Charge 100 grams of a Titanium Dioxide pigment (TiPure LW) to a sand grinding apparatus equipped with means for blanketing the charge with an inert gas, e.g. nitrogen, and explosion-proof electrical fittings, together with 120 grams of styrene, 40 grams of methylmethacrylate, 10 grams of dimethylaminoethylmethacrylate and 30 grams of 50% divinylbenzene, together with sufficient grinding medium such as Ottawa sand to ensure efficient grinding. Mill the charge until a representative sample under microscopic examination shows that essentially all the particles thereof are between 0.1 and 0.2 micron in diameter. After separation from the grinding medium, e.g. by conventional screening the inorganic pigment dispersion is charged to a polymerization vessel equipped for emulsion polymerization containing therein a solution of 100 grams of N-tallow trimethlenediamine as the acetate in 600 ml. of water together with sufficient glacial acetic acid to adjust the pH of said solution to around 5.0. The addition of the inorganic pigment dispersion is made under such conditions as to ensure efficient emulsification of the monomer components thereof e.g. slowly with agitation. After the addition is completed, the emulsion polymerization system is heated, with continuing agitation, to 45°–50° C. at which point a solution of 5 grams of potassium persulfate in 150 ml. of water and 2 grams of sodium bisulfite dissolved in 50 ml. of water are added. Heating is continued to 60°–65° C. and the temperature maintained at this level for five hours under agitation. On cooling an intraleucospheruloid pigment is obtained which under microscopic examination shows essentially all of its primary particles to be composed of spheruloids below 1 micron in size. The product may be used as is as a wet dispersion or it may be isolated by the addition of a coagulating agent such as alcohol or a base such as sodium hydroxide, filtered, washed and dried to yield 300 grams of intraleucospheruloid pigment, said intraleucospheruloid pigment possessing functional basic groups absorbed therein by virtue of the emulsifying material used in the polymerization.

Example L (Micronizing in monomer systems)

The procedure of Example K is followed with the exception that in place of the potassium persulfate/ sodium bisulfite initiator system employed, is used instead 6 grams of azobisisobutyronitrile, said azobisisobutyronitrile being incorporated into the micronizing step during the last two hours of same.

Example M (Micronizing in nonaqueous solvent with the aid of a volatile, monomer miscible solvent and pigment modifying agent)

Charge 60 grams of Rutile type Titanium Dioxide pigment (TiPure R-900 DuPont) and 40 grams of a paper grade Silica pigment (HiSil 404-PPG) to a sand grinding apparatus equipped with external cooling, inert gas blanket and explosion-proof electrical apparatus together with 80 grams of methylmethacrylate, 10 grams of dimethylaminoethylmethacrylate and 10 grams of ethyleneglycoldimethacrylate and 100 grams of a monomer miscible volatile diluent such as cyclohexane. Mill the charge until a representative sample under microscopic examination shows that essentially all the particles thereof are between 0.1 and 0.2 micron in diameter. After separation from the grinding medium, e.g. by conventional screening, the inorganic pigment dispersion is charged to a polymerization vessel equipped for emulsion polymerization containing therein a solution of 200 grams of the sodium salt of a sulfate ester of an alkylphenoxy poly(ethyleneoxy)ethanol (28%active) (Alipal CO 433) dissolved in 400 ml. of water and sufficient ammonium hydroxide (28% solution) to adjust the pH to between 10.5 and 11.0.

The addition of the inorganic pigment dispersion is made under such conditions as to ensure efficient emulsification of the monomer components thereof, e.g. slowly with agitation. After the addition is completed the cyclohexane is removed under reduced pressure and the emulsion polymerization system is heated, with continuing agitation to 45°-50° C. at which point a solution of 4 grams of potassium persulfate dissolved in 75 ml. of water and 2 grams of sodium bisulfite dissolved in 25 ml. of water are added. Heating is continued to 65-70° C. and the temperature maintained at this level for four and one half hours. On cooling an intraleucospheruloid pigment is obtained which under microscopic examination shows essentially all of its primary particles to be composed of spheruloids below 1 micron in size. No evidence can be found of separation of the two respective inorganic leuco pigment components thereof. The product may be used as is as a wet dispersion or it may be isolated by the addition of a coagulating agent such as alcohol or alcohol/aqueous acid combination or by conventional salting out as with sodium chloride, filtered, washed and dried to yield 200 grams of intraleucospheruloid pigment material.

The following tabular Examples further exemplify the application of the procedures hereinabove set forth, give the proportions of ingredients in grams, in the order of their addition and the order of the processing operations, as well as the nature of the products produced thereby. In the Examples herein set forth the product from the polymerization step was determined by microscopic examination to be in spheruloids of less than 4.0 microns average diameter, and was essentially nonsettling i.e. a latex. In the Examples, materials designated by chemical name under "Trade Name" are of commercial grade; those designated by proprietary name thereunder are further identified therewith.

In the examples given above and hereinafter, a particular point of distinction between the preferred cross-linked embodiments of the invention and the less preferred noncross-linked embodiments is that the cross-linking renders the spheruloids not only insoluble in physical solvents, but also nonfusible. Thus the preferred embodiments are particularly adapted for coloring plastic melts before extrusion, as the infusibility assures integrity of the spheruloids under extrusion temperatures and insures against any alteration of the flow characteristics of the melt, which may be caused by softening of the spheruloids in the case of the less preferred embodiments. In addition, the cross-linking of a polymer increases its density and thus increases its refractive index to a degree. Therefore the cross-linking, as well as the choice of monomer materials used, aids in adapting the product to have the necessary difference in refractive index from that of a vehicle in which it is intended to be used, particularly when the vehicle has a density or refractive index only slightly below that of the corresponding noncross-linked spheruloids.

Whether the spheruloids are cross-linked or noncross-linked, their uniformity in size and spheruloidal nature particularly adapt them for use in electrostatic coating systems, and by controlling the polymerization conditions as above exemplified the size of the spheruloids may be maintained within specified limits adapting them for gloss or matte finishes or for special purposes as desired.

TABLE 1

| | Preparation of Intraleucospheruloid Pigment Combinations (parts by weight) | | | | |
|---|---|---|---|---|---|
| Example 1 | 1 | 2 | 3 | 4 | 5 |
| A. Micronizing Step | | | | | |
| 1. Trade Name | TiPure LW | Unitane OR 450 | Titanox RA | TiPure R941 Slurry | Oncor 23A |
| Pigment, dry basis | 40 | 40 | 40 | 40 | 4 |
| 2. Surface Active Agent* Material | | | | | |
| Alipal CO 433[1/] | 38 | 20 | — | — | 20 |
| Triton X 405[2/] | — | — | — | 40 | 20 |
| Monaquat TIBC[3/] | — | — | 40 | — | — |
| Ammonium Hydroxide 28% | 10 | 5 | — | 5 | 5 |
| Acetic Acid | — | — | 20 | — | — |
| 3. Water | | | | | |
| Quantity | 310 | 283 | 300 | 263 | 263 |
| 4. Pigment Bonding Agent Material | | | | | |
| Monaquat TIBC[3/] | — | 2 | — | 2 | 2 |
| PEI 18[4/] | 2 | — | — | — | — |
| 28% "N" Sodium Silicate | 20 | — | — | — | — |
| 5. Dispersion or Micronizing Method | Ball | Sand | Ball | Sand | Sand |

TABLE 1-continued

Preparation of Intraleucospheruloid Pigment Combinations
(parts by weight)

| Example 1 | 1 | 2 | 3 | 4 | 5 |
|---|---|---|---|---|---|
| Time, hours approx. | 36 | 24 | 36 | 24 | 36 |
| Temperature °C. | 28 | 28 | 28 | 28 | 28 |
| Average Particle Size Diameter (microns) | <0.2 | <0.2 | <0.2 | <0.2 | <0.2 |
| 6. Separation | | | | | |
| Screening (X) | X | X | X | X | X |
| 7. Water Dilution | 200 | 200 | 200 | 200 | 200 |
| 8. Yield | | | | | |
| Aqueous Pigment Dispersion | 600 | 550 | 600 | 550 | 550 |
| B. Polymerization Step | | | | | |
| 9. Surface Active Agent* | | | | | |
| a. Quantity, type | $30^{2/}$ | $30^{1/}$ | $20^{2/}$ | $20^{2/}$ | $30^{1/}$ |
| b. Quantity, type | — | — | — | — | $10^{2/}$ |
| Water | 60 | 60 | 80 | 70 | 50 |
| Ammonium Hydroxide 28% | 10 | 10 | — | 10 | 10 |
| 10. Pigment Bonding Agent Material | | | | | |
| Formaldehyde 37% solution | — | 7.5 | — | — | — |
| Urea | — | 2.5 | — | — | — |
| 11. Monomer Material Non Crosslinking | | | | | |
| Styrene | 60 | — | 60 | 40 | — |
| Methylmethacrylate | — | 70 | — | 30 | 70 |
| Dimethylaminoethylmethacrylate | 5 | 5 | — | 5 | 5 |
| 11B. Monomer Material Crosslinking | | | | | |
| Divinylbenzene 50% | 20 | — | 20 | 20 | — |
| Ethyleneglycoldimethacrylate | — | 10 | — | — | 10 |
| 12. Polymerization Initiator | | | | | |
| AZDN$^{5/}$ | 3 | 3 | — | 3 | — |
| Potassium Persulfate | — | — | 2.5 | — | 2.5 |
| Sodium Bisulfite | — | — | 1.25 | — | 1.25 |
| 13. Polymerization Conditions | | | | | |
| Time, hours | 5 | 5 | 6 | 5 | 7 |
| Temperature, °C. | 80 | 80 | 70 | 80 | 65 |
| Conversion Approx. 100% (X) | X | X | X | X | X |
| 14. Intraleucospheruloid Pigment Dispersion | | | | | |
| Yield | 785 | 745 | 780 | 745 | 735 |
| Latex (x) | — | — | — | x | x |

*Capable of effecting emulsion polymerization.
$^{1/}$sodium salt of a sulfate ester of an alkylphenoxy poly(ethyleneoxy)ethanol (28% active)
$^{2/}$octylphenoxy polyethoxy ethanol (70% active)
$^{3/}$substituted imidazoline quaternized with benzylchloride (100% active)
$^{4/}$polyethyleneimine solution, manufactured by Dow, water soluble
$^{5/}$azobisisobutyronitrile
TiPure LW Trade Name for DuPont titanium dioxide pigment
TiPure R941 Trade Name for DuPont titanium dioxide pigment
Unitane OR450 Trade Name for American Cyanamid titanium dioxide pigment
Titanox RA Trade Name for NL Industries titanium dioxide pigment
Oncor 23A Trade Name for NL Industries antimony oxide pigment

TABLE 2

Preparation of Intraleucospheruloid Pigment Combinations
(parts by weight)

| Example No. 2 | 1 | 2 | 3 | 4 | 5 |
|---|---|---|---|---|---|
| A. Micronizing Step | | | | | |
| 1. Trade Name | Zirconium Oxide | Zinc Oxide | Alumina | Aluminum Hydroxide | Barium Sulfate |
| Pigment, dry basis | 30 | 30 | 40 | 40 | 30 |
| 2. Surface Active Agent Material* | | | | | |
| Alipal CO 433$^{1/}$ | — | 9 | 9 | — | 10 |
| Triton X 400$^{2/}$ | 10 | — | — | — | — |
| Triton X 405$^{3/}$ | 10 | 10 | 10 | 25 | 10 |
| Ammonium Hydroxide 28% | — | — | — | 1 | 1 |
| Acetic Acid | 5 | — | — | — | — |
| 3. Water | | | | | |
| Quantity | 245 | 241 | 281 | 272 | 239 |
| 4. Pigment Bonding Agent Material | | | | | |
| TEPA$^{4/}$ 10% solution | — | 10 | 10 | 10 | 10 |
| 5. Dispersion or Micronizing | | | | | |
| Method | Sand | Sand | Sand | Sand | Ball |
| Time, hours approx. | 48 | 48 | 48 | 36 | 48 |
| Temperature | 28 | 28 | 28 | 28 | 28 |
| Average Particle Size Diameter (Microns) | <0.2 | <0.2 | <0.2 | <0.2 | <0.2 |
| 6. Separation | | | | | |
| Screening (X) | X | X | X | X | X |
| 7. Water dilution | 200 | 200 | 200 | 200 | 200 |
| 8. Yield | | | | | |
| Aqueous Pigment Dispersion | 500 | 500 | 550 | 550 | 500 |
| B. Polymerization Step | | | | | |

TABLE 2-continued

Preparation of Intraleucospheruloid Pigment Combinations
(parts by weight)

| Example No. 2 | 1 | 2 | 3 | 4 | 5 |
|---|---|---|---|---|---|
| 9. Surface Active Agent* | | | | | |
|   a. Quantity, type | 35[3/] | 25[1/] | 15[1/] | 35[3/] | 25[1/] |
|   b. Quantity, type | — | 10[3/] | 15[3/] | — | — |
|   Water | 65 | 65 | 70 | 65 | 75 |
| 10. Pigment Bonding Agent Material | | | | | |
|   PEI 600[5/] | — | — | — | 10 | — |
| 11. Monomer Material Non Crosslinking | | | | | |
|   Methylmethacrylate | — | 10 | 20 | — | 40 |
|   Styrene | 50 | 30 | 60 | 60 | 30 |
|   Acrylonitrile | 10 | 20 | — | — | 5 |
|   Dimethylaminoethylmethacrylate | 10 | 5 | — | — | 5 |
| 11B. Monomer Material Crosslinking | | | | | |
|   Ethyleneglycoldimethacrylate | 10 | 5 | 10 | — | 10 |
|   Divinylbenzene 50% | — | — | — | 20 | — |
| 12. Polymerization Initiator | | | | | |
|   AZDN[6/] | — | 3 | — | 3 | 3 |
|   Cumene hydroperoxide | 3 | — | 3 | — | — |
| 13. Polymerization Conditions | | | | | |
|   Time, hours | 5 | 5 | 5 | 5 | 5 |
|   Temperature, °C. | 80 | 80 | 80 | 80 | 80 |
|   Conversion Approx. 100% (X) | X | X | X | X | X |
| 14. Intraleucospheruloid Pigment | | | | | |
|   Dispersion Yield | 680 | 670 | 740 | 730 | 690 |

*Capable of effecting emulsion polymerization.
[1/]sodium salt of a sulfate ester of an alkylphenoxy poly(ethyleneoxy)ethanol 28% active
[2/]stearyl dimethyl benzyl ammonium chloride (82% active)
[3/]octylphenoxy polyethoxy ethanol (70% active)
[4/]tetraethylenepentamine
[5/]polyethylenimine solution, manufactured by Dow, water soluble
[6/]azobisisobutyronitrile

TABLE 3

Preparation of Intraleucospheruloid Pigment Combinations
(parts by weight)

| Example No. 3 | 1 | 2 | 3 | 4 | 5 |
|---|---|---|---|---|---|
| A. Micronizing Step | | | | | |
| 1. Trade Name | HiSil 404 | HiSil 233 | Cab-O-Sil M5 | Celite 281 | Silene EF |
|   Pigment, dry basis | 40 | 40 | 40 | 40 | 40 |
| 2. Surface Active Agent Material* | | | | | |
|   Triton X 405[1/] | 20 | — | — | 20 | 20 |
|   Triton X 400[2/] | — | 20 | — | — | — |
|   Alipal CO 433[3/] | — | — | 10 | — | 44 |
|   Tamol SN[4/] | 2 | — | 1 | 1 | — |
|   Ammonium Hydroxide 28% | 4 | — | — | 5 | — |
|   Acetic Acid | — | 10 | — | — | — |
| 3. Water | | | | | |
|   Quantity | 283 | 280 | 348 | 283 | 295 |
| 4. Pigment Bonding Agent Material | | | | | |
|   TEPA[5/] 10% solution | 1 | — | 1 | 1 | 1 |
| 5. Dispersion or Micronizing | | | | | |
|   Method | Sand | Ball | Sand | Sand | Ball |
|   Time, hours approx. | 24 | 36 | 24 | 24 | 36 |
|   Temperature, °C. | 28 | 28 | 28 | 28 | 28 |
|   Average Particle Size Diameter (microns) | <0.2 | <0.1 | <0.1 | <0.2 | <0.2 |
| 6. Separation | | | | | |
|   Screening (X) | X | X | X | X | X |
| 7. Water dilution | 200 | 200 | 200 | 200 | 200 |
| 8. Yield | | | | | |
|   Aqueous Pigment Dispersion | 550 | 550 | 600 | 550 | 600 |
| B. Polymerization Step | | | | | |
| 9. Surface Active Agent* | | | | | |
|   a. Quantity, type | 20[1/] | 20[1/] | 20[3/] | 20[1/] | — |
|   b. Quantity, type | 10[3/] | — | — | 10[3/] | — |
|   Water | 70 | 80 | 80 | 70 | 100 |
| 10. Pigment Bonding Agent Material | | | | | |
|   28% "N" sodium silicate | — | 10 | — | — | — |
| 11. Monomer Material Non Crosslinking | | | | | |
|   Styrene | 60 | — | — | 20 | 30 |
|   Methylmethacrylate | — | 60 | — | 40 | 30 |
|   Vinyltoluene | — | — | 60 | — | — |
| 11B. Monomer Material Crosslinking | | | | | |
|   Divinylbenzene 50% | 10 | — | 10 | — | 10 |
|   Ethyleneglycoldimethacrylage | — | 10 | — | 10 | — |
| 12. Polymerization Initiator | | | | | |

TABLE 3-continued

Preparation of Intraleucospheruloid Pigment Combinations
(parts by weight)

| Example No. 3 | 1 | 2 | 3 | 4 | 5 |
|---|---|---|---|---|---|
| AZDN[6/] | 2 | — | 2 | — | 2 |
| Potassium persulfate | — | 2.5 | — | 2.5 | — |
| Sodium bisulfite | — | 1.25 | — | 1.25 | — |
| 13. Polymerization Conditions | | | | | |
| Time, hours | 5 | 6 | 5 | 6 | 5 |
| Temperature, °C. | 80 | 70 | 80 | 70 | 80 |
| Conversion Approx. 100% (X) | X | X | X | X | X |
| 14. Intraleucospheruloid Pigment Dispersion | | | | | |
| Yield | 720 | 730 | 770 | 720 | 770 |
| Latex (X) | X | X | X | — | — |

*Capable of effecting emulsion polymerization.
[1/] octylphenoxy polyethoxy ethanol (70% active)
[2/] stearyl dimethyl benzyl ammonium chloride (82% active)
[3/] sodium salt of a sulfate ester of an alkylphenoxy poly(ethyleneoxy)ethanol (28% active)
[4/] sodium salt of condensed napthalene sulfonic acid
[5/] tetraethylenepentamine
[6/] azobisisobutyronitrile
HiSil 404 Trade name for PPG Industries precipitated silica, paper grade
HiSil 233 Trade Name for PPG Industries precipitated silica, reinforcing grade
Cab-O-Sil M5 Trade Name for Cabot Corporation pyrogenic silica
Celite 281 Trade Name for Johns-Mansville Corp. natural silica
Silene EF Trade Name for PPG Industries precipitated silica, calcium modified

TABLE 4

Preparation of Intraleucospheruloid Pigment Combinations
(parts by weight)

| Example No. 4 | 1 | 2 | 3 | 4 | 5 |
|---|---|---|---|---|---|
| A. Micronizing Step | | | | | |
| 1. Trade Name | Al-Sil-Ate HO | Excelopax Zirconium silicate | Silica, Reinforcing grade wet PP | Silica, Paper grade wet PP | Ludox Colloidal silica HS 40 |
| Pigment, dry basis | 30 | 40 | 40 | 40 | 35 |
| 2. Surface Active Agent* Material | | | | | |
| Duponol ME[1/] | 2 | — | — | 2 | — |
| Triton X 400[2/] | — | 10 | — | — | — |
| Triton X 405[3/] | 10 | 10 | 10 | — | — |
| Alipal CO 433[4/] | — | — | 5 | 10 | — |
| Acetic Acid | — | 5 | — | — | — |
| Ammonium hydroxide 28% | 5 | — | 5 | 5 | — |
| 3. Water | | | | | |
| Quantity | 241 | 285 | 288 | 241 | 265 |
| 4. Pigment Bonding Agent Material | | | | | |
| Duomac T[5/] | 2 | — | 2 | 2 | — |
| 28% N Sodium Silicate | 10 | — | — | — | — |
| 5. Dispersion or Micronizing | | | | | |
| Method | Sand | Sand | Sand | Sand | — |
| Time, hours approx. | 24 | 48 | 24 | 24 | — |
| Temperature, °C. | 28 | 28 | 28 | 28 | 28 |
| Average Particle Size Diameter (microns) | <0.2 | <0.2 | <0.02 | <0.2 | <0.02 |
| 6. Separation | | | | | |
| Screening (X) | X | X | X | X | — |
| 7. Water dilution | 200 | 250 | 200 | 250 | 200 |
| 8. Yield | | | | | |
| Aqueous Pigment Dispersion | 500 | 600 | 550 | 550 | 500 |
| B. Polymerization Step | | | | | |
| 9. Surface Active Agent* | | | | | |
| a. Quantity, type | 10[1/] | 10[2/] | 30[3/] | 10[1/] | 30[3/] |
| b. Quantity, type | 20[3/] | 20[3/] | — | — | 10[4/] |
| Water | 70 | 70 | 70 | 90 | 60 |
| 10. Pigment Bonding Agent Material | | | | | |
| Urea | — | 2.5 | — | — | — |
| Formaldehyde 37% solution | — | 7.5 | — | — | — |
| 11. Monomer Material Non Crosslinking | | | | | |
| Styrene | 50 | 30 | — | 50 | 61 |
| 4 Vinylpyridine | — | 6 | — | — | 10.5 |
| Methacrylic Acid | — | — | — | 5 | 8.5 |
| Methylmethacrylate | — | 19 | 50 | 15 | — |
| 11B. Monomer Material Crosslinking | | | | | |
| Divinylbenzene 50% | 10 | 10 | 10 | 10 | 10 |
| 12. Polymerization Initiator | | | | | |
| AZDN[6/] | 2.5 | 2.5 | 2.5 | 2.5 | 3.0 |
| 13. Polymerization Conditions | | | | | |
| Time, hours | 5 | 5 | 5 | 5 | 5 |
| Temperature, °C. | 80 | 80 | 80 | 80 | 80 |
| Conversion Approx. 100% (X) | X | X | X | X | X |

TABLE 4-continued

Preparation of Intraleucospheruloid Pigment Combinations
(parts by weight)

| Example No. 4 | 1 | 2 | 3 | 4 | 5 |
|---|---|---|---|---|---|
| 14. Intraleucospheruloid Pigment Dispersion | | | | | |
| Yield | 660 | 775 | 710 | 730 | 690 |
| Latex (X) | — | — | X | — | X |

*Capable of effecting emulsion polymerization
[1] sodium lauryl sulfate (100% active)
[2] stearyl dimethyl benzyl ammonium chloride (82% active)
[3] octylphenoxy polyethoxy ethanol (70% active)
[4] sodium salt of a sulfate ester of an alkylphenoxy poly(ethyleneoxy)ethanol (28% active)
[5] n-tallow trimethylene diamine diacetate (85% active)
[6] azobisisobutyronitrile
Al-Sil-Ate Trade Name for Freeport Kaolin aluminum silicate
Excelopax Trade Name for NL Industries zirconium silicate
Ludox Trade Name for DuPont colloidal silica HS 40

TABLE 5

Preparation of Intraleucospheruloid Pigment Combinations
(parts by weight)

| Example No. 5 | 1 | | 2 | |
|---|---|---|---|---|
| A. Micronizing Step | | | | |
| 1. Trade Name | HiSil 233 | TiPure R941 Slurry | HiSil 404 | Zirconium Oxide |
| Pigment, dry basis | 20 | 40 | 20 | 40 |
| 2. Surface Active Agent* Material | | | | |
| Alipal CO 433 [1] | — | | 20 | |
| Monazoline T [2] | 20 | | — | |
| Triton X 400 [3] | — | | — | |
| Triton X 405 [4] | 20 | | 10 | |
| Acetic Acid | 10 | | — | |
| Ammonium Hydroxide 28% | — | | 10 | |
| 3. Water | | | | |
| Quantity | 270 | | 298 | |
| 4. Pigment Bonding Agent Material | | | | |
| Titanium oxychloride | 20 | | — | |
| Monazoline T [2] | — | | 2 | |
| 5. Dispersion or Micronizing | | | | |
| Method | Ball | | Ball | |
| Time, hours approx. | 48 | | 60 | |
| Temperature ° C. | 28 | | 28 | |
| Average Particle Size Diameter (microns) | <0.2 | | <0.2 | |
| 6. Separation | | | | |
| Screening (X) | X | | X | |
| 7. Water Dilution | 300 | | 300 | |
| 8. Yield | | | | |
| Aqueous Pigment Dispersion | 700 | | 700 | |
| B. Polymerization Step | | | | |
| 9. Surface Active Agent* | | | | |
| a. Quantity, type | 45 [3] | | 20 [3] | |
| b. Quantity, type | — | | — | |
| Water | 55 | | 80 | |
| 10. Pigment Bonding Agent Material | — | | — | |
| 11. Monomer Material Non Crosslinking | | | | |
| Styrene | 40 | | 70 | |
| Methylmethacrylate | 30 | | — | |
| 11B. Monomer Material Crosslinking | | | | |
| Divinylbenzene 50% | 10 | | 10 | |
| 12. Polymerization Initiator | | | | |
| AZDN [5] | 3 | | — | |
| Cumene hydroperoxide | — | | 3 | |
| 13. Polymerization Conditions | | | | |
| Time, hour | 5 | | 5 | |
| Temperature, ° C. | 80 | | 80 | |
| Conversion Approx. 100% (X) | X | | X | |
| 14. Intraleucospheruloid Pigment Dispersion | | | | |
| Yield | 880 | | 880 | |
| Latex (X) | X | | — | |

*Capable of effecting emulsion polymerization.
[1] sodium salt of a sulfate ester of an alkylphenoxy poly(ethyleneoxy)ethanol (28% active)
[2] substituted imidazoline of tall oil (100% active)
[3] stearyl dimethyl benzyl ammonium chloride (82% active)
[4] octylphenoxy polyethoxy ethanol (70% active)
[5] azobisisobutyronitrile
HiSil 233 Trade Name for PPG Industries precipitated silica, reinforcing grade
TiPure R941 Trade Name for DuPont titanium dioxide pigment
HiSil 404 Trade Name for PPG Industries precipitated silica, paper grade

TABLE 6

Preparation of Intraleucospheruloid Pigment Combinations
(parts by weight)

| Example No. 6 | 1 | | 2 | |
|---|---|---|---|---|
| A. Micronizing Step | | | | |
| 1. Trade Name | Silene D | Alumina | HiSil 233 | Zinc Oxide |
| Pigment, dry basis | 20 | 40 | 20 | 20 |
| 2. Surface Active Agent* Material | | | | |
| Alipal CO 433[1] | | 20 | | 20 |
| Triton X 405[2] | | 10 | | 10 |
| Ammonium Hydroxide 28% | | 5 | | — |
| 3. Water | | | | |
| Quantity | | 303 | | 280 |
| 4. Pigment Bonding Agent Material | | | | |
| Monazoline T[3] | | 2 | | — |
| 5. Dispersion or Micronizing | | | | |
| Method | | Sand | | Sand |
| Time, hours approx. | | 48 | | 48 |
| Temperature, °C. | | 28 | | 28 |
| Average particle size, Diameter (microns) | | <0.2 | | <0.2 |
| 6. Separation | | | | |
| Screening (X) | | X | | X |
| 7. Water Dilution | | 250 | | 250 |
| 8. Yield | | | | |
| Aqueous Pigment Dispersion | | 650 | | 600 |
| B. Polymerization Step | | | | |
| 9. Surface Active Agent* | | | | |
| a. Quantity, type | | 35[3] | | 20[3] |
| b. Quantity, type | | — | | — |
| Water | | 65 | | 80 |
| 10. Pigment Bonding Agent Material | | | | |
| PEI 18[4] | | — | | 10 |
| 11. Monomer Material Non Crosslinking | | | | |
| Vinyltoluene | | 40 | | 50 |
| Acrylonitrile | | 10 | | — |
| Dimethylaminoethylmethocrylate | | 5 | | 10 |
| 11B. Monomer Material Crosslinking | | | | |
| Ethyleneglycoldimethacrylate | | 10 | | 10 |
| 12. Polymerization Initiator | | | | |
| AZDN[5] | | 3 | | 3 |
| 13. Polymerization Conditions | | | | |
| Time, hours | | 6 | | 6 |
| Temperature, °C. | | 80 | | 80 |
| Conversion Approx. 100% (X) | | X | | X |
| 14. Intraleucospheruloid Pigment Dispersion | | | | |
| Yield | | 815 | | 780 |

*Capable of effecting emulsion polymerization.
[1] sodium salt of a sulfate ester of an alkylphenoxy poly(ethyleneoxy)ethanol (28% active)
[2] ocytlphenoxy polyethoxy ethanol (70% active)
[3] substituted imidazoline of tall oil (100% active)
[4] polyethyleneimine solution, manufactured by Dow, water soluble
[5] azobisisobutyronitrile
Silene D Trade Name for PPG Industries precipitated silica, calcium treated
HiSil 233 Trade Name for PPG Industries precipitated silica, reinforcing grade

TABLE 7

Preparation of Intraleucospheruloid Pigment Combinations
(parts by weight)

| Example No. 7 | 1 | 2 | 3 | 4 | 5 |
|---|---|---|---|---|---|
| A. Micronizing Step | | | | | |
| 1. Trade Name | HiSil 233 | TiPure LW | Oncor 23A | Silene D | Excelopax Zirconium Silicate |
| Pigment, dry basis | 40 | 40 | 40 | 40 | 40 |
| 2. Surface Active Agent* Material | | | | | |
| Alipal CO 433[1] | 10 | 10 | 10 | — | 10 |
| SMA Copolymer[2] | 10 | — | 20 | — | — |
| SAMV Copolymer[3] | — | 20 | — | — | 20 |
| N-group polymer[4] | — | — | — | 20 | — |
| Triton X 405[5] | — | — | — | 20 | — |
| Acetic Acid | — | — | — | 5 | — |
| Ammonium Hydroxide 28% | 2 | 10 | 5 | — | 2 |
| 3. Water | | | | | |
| Quantity | 278 | 260 | 275 | 265 | 277 |
| 4. Pigment Bonding Agent Material | | | | | |
| TEPA[6] 10% solution | 10 | — | — | — | — |
| PEI 600[7] | — | 10 | — | — | — |
| Monaquat TIBC | — | — | — | — | 1 |
| 5. Dispersing or Micronizing | | | | | |
| Method | Ball | Sand | Sand | Ball | Sand |

TABLE 7-continued

Preparation of Intraleucospheruloid Pigment Combinations
(parts by weight)

| Example No. 7 | 1 | 2 | 3 | 4 | 5 |
|---|---|---|---|---|---|
| Time, hours Approx. | 24 | 48 | 48 | 36 | 48 |
| Temperature | 28 | 28 | 28 | 28 | 28 |
| Average particle size Diameter (microns) | <0.02 | <0.2 | <0.2 | <0.2 | <0.2 |
| 6. Separation | | | | | |
| Screening (X) | X | X | X | X | X |
| 7. Water Dilution | 250 | 250 | 250 | 250 | 250 |
| 8. Yield | | | | | |
| Aqueous Pigment Dispersion | 600 | 600 | 600 | 600 | 600 |
| B. Polymerization Step | | | | | |
| 9. Surface Active Agent* | | | | | |
| a. Quantity, type | 20[1/] | 20[1/] | 10[1/] | 20[5/] | 10[1/] |
| b. Quantity, type | 20[5/] | 20[5/] | — | — | 10[5/] |
| Water | 60 | 60 | 90 | 80 | 80 |
| 10. Pigment Bonding Agent Material | | | | | |
| PEI 600[7/] | — | — | 10 | — | — |
| 11. Monomer Material Non Crosslinking | | | | | |
| Styrene | 50 | — | 25 | — | — |
| Methylmethacrylate | — | 50 | 25 | 25 | — |
| Vinyltoluene | — | — | — | 25 | 50 |
| 11B. Monomer Material Crosslinking | | | | | |
| Divinylbenzene 50% | 10 | 10 | 10 | 10 | 10 |
| 12. Polymerization Initiator | | | | | |
| AZDN[8/] | 2.5 | 2.5 | 2.5 | 2.5 | 2.5 |
| Cumene hydroperoxide | 1 | 1 | — | 1 | 1 |
| 13. Polymerization Conditions | | | | | |
| Time, hours | 5 | 6 | 5 | 6 | 5 |
| Temperature, °C. | 80 | 75 | 80 | 75 | 80 |
| Conversion Approx. 100% (X) | X | X | X | X | X |
| 14. Intraleucospheruloid Pigment | | | | | |
| Dispersion | | | | | |
| Yield | 760 | 760 | 770 | 760 | 760 |
| Latex (X) | X | — | — | — | — |

*Capable of effecting emulsion polymerization
[1/] sodium salt of a sulfate ester of an alkylphenoxy poly(ethyleneoxy)ethanol (28% active)
[2/] copolymer of styrene, methacrylic acid and acrylonitrile ratio 25/65/10
[3/] amphoteric copolymer of styrene, acrylonitrile, methacrylic acid and 4-vinylpyridine, ratio 25/10/29/36
[4/] 4-vinylpyridine homopolymer
[5/] octylphenoxy polyethoxy ethanol (70% active)
[6/] tetraethylenepentamine
[7/] polyethyleneimine solution, manufactured by Dow, water soluble
[8/] azobisisobutyronitrile
HiSil 233 Tradename for PPG Industries precipitated silica, reinforcing grade
TiPure LW Tradename for DuPont titanium dioxide pigment
Oncor 23A Tradename for NL Industries antimony oxide pigment
Silene D Tradename for PPG Industries precipitated silica, calcium treated
Excelopax Tradename for NL Industries zirconium silicate

TABLE 8

Preparation of Intraleucospheruloid Pigment Combinations
(parts by weight)

| Example No. 8 | 1 | 2 | 3 | 4 | 5 |
|---|---|---|---|---|---|
| A. Micronizing Step | | | | | |
| 1. Pigment Class or Trade Name | Titanox RA 47 | TiPure LW | TiPure R941 Slurry | Unitane OR450 | Oncor 23A |
| Pigment, dry basis | 40 | 40 | 40 | 40 | 40 |
| 2. Surface Active Agent* Material (Trade Name) | | | | | |
| Alipal CO 433[1/] | 20 | 40 | — | — | 20 |
| Duomeen T[2/] | — | 2 | 40 | 2 | 2 |
| Triton X 405[3/] | — | 50 | — | 40 | 20 |
| Ammonium Hydroxide 28% | 10 | 5 | — | — | 5 |
| Acetic Acid | — | — | 20 | — | — |
| 3. Water | | | | | |
| Quantity | 270 | 263 | 248 | 268 | 263 |
| 4. Pigment Bonding Agent Material | | | | | |
| Urea | 2.5 | — | — | — | 2.5 |
| Formaldehyde 37% | 7.5 | — | — | — | 7.5 |
| PEI 600 [4/] | — | — | 2 | — | — |
| 28% "N" Sodium Silicate | — | — | — | 10 | — |
| 5. Dispersion or Micronizing | | | | | |
| Method | Sand | Ball | Sand | Sand | Sand |
| Time, hours approx. | 36 | 48 | 24 | 36 | 36 |
| Temperature | 28 | 28 | 28 | 28 | 28 |
| Average Particle Size Diameter (Microns) | <0.2 | <0.2 | <0.2 | <0.2 | <0.2 |
| 6. Separation | | | | | |

TABLE 8-continued
Preparation of Intraleucospheruloid Pigment Combinations
(parts by weight)

| Example No. 8 | 1 | 2 | 3 | 4 | 5 |
|---|---|---|---|---|---|
| Screening (X) | X | X | X | X | X |
| 7. Water Dilution | 250 | 250 | 250 | 250 | 250 |
| 8. Yield | | | | | |
| Aqueous Pigment Dispersion | 600 | 650 | 600 | 600 | 600 |
| B. Polymerization Step | | | | | |
| 9. Surface Active Agent Material* | | | | | |
| a. Quantity, type | 30[1/] | — | — | 20[1/] | 30[3/] |
| b. Quantity, type | — | — | — | — | — |
| Water | 60 | 90 | 100 | 65 | 60 |
| Ammonium Hydroxide 28% | 10 | 10 | — | 15 | 10 |
| 10. Pigment Bonding Agent Material | | | | | |
| TEPA[5/] 10% solution | — | 10 | — | — | — |
| Z6020 Silane[6/] | — | 2 | — | — | — |
| 11. Monomer Material Non Crosslinking | | | | | |
| Styrene | 50 | — | 25 | — | 30 |
| Methylmethacrylate | — | 50 | 20 | 25 | 10 |
| Cyclohexylmethacrylate | — | — | — | 20 | 10 |
| 4 Vinylpyridine | 5 | 5 | — | 5 | — |
| 12. Polymerization Initiator | | | | | |
| AZDN[7/] | 2 | 2 | — | 2 | 2 |
| Potassium Persulfate | — | — | 2.5 | — | — |
| Sodium Bisulfite | — | — | 1.25 | — | — |
| Polymerization Conditions | | | | | |
| 13. Time, hours | 5 | 5 | 6 | 5 | 5 |
| Temperature, °C. | 80 | 80 | 70 | 80 | 80 |
| Approx. 100% (X) | X | X | X | X | X |
| 14. Intraleucospheruloid Pigment Dispersion | | | | | |
| Yield | 755 | 817 | 745 | 750 | 750 |
| Latex (X) | — | — | X | — | — |

*Capable of effecting emulsion polymerization.
[1/]sodium salt of a sulfate ester of an alkylphenoxy poly(ethyleneoxy) ethanol (28% active)
[2/]N-tallow trimethylene diamine (85% active)
[3/]octylphenoxy polyethoxy ethanol (70% active)
[4/]Polyethyleneimine solution (R) Dow Chemical Company
[5/]Tetraethylenepentamine
[6/]N-2-aminoethyl(-3- aminopropyl trimethoxysilane, manufactured by Dow
[7/]azobisisobutyronitrile
Titanox RA 47 (R) Tradename for N L Industries Titanium Dioxide Pigment
TiPure LW (R) Tradename for DuPont Titanium Dioxide pigment
TiPure R941 (R) Trademark for DuPont Titanium Dioxide pigment
Unitane OR450 (R) Trademark for American Cyanamid Titanium Dioxide Pigment
Oncor 23A (R) Trademark for NL Industries Antimony Oxide pigment

TABLE 9
Preparation of Intraleucospheruloid Pigment Combinations
(parts by weight)

| Example No. 9 | 1 | 2 | 3 | 4 | 5 |
|---|---|---|---|---|---|
| A. Micronizing Step | | | | | |
| 1. Pigment Class or Trade Name | Zinc Oxide | Zirconium Oxide | Aluminum Oxide | Aluminum Hydroxide | Barium Sulfate |
| Pigment, dry basis | 30 | 40 | 30 | 40 | 30 |
| 2. Surface Active Agent* Material (Trade Name) | | | | | |
| Alipal CO 433[1/] | 10 | — | 10 | — | 10 |
| Monazoline T[2/] | — | 15 | — | — | — |
| Triton X 405[3/] | 10 | 10 | 10 | 30 | 10 |
| Ammonium Hydroxide 28% | — | — | — | 2 | 2 |
| Acetic Acid | — | 7 | — | — | — |
| 3. Water | | | | | |
| Quantity | 240 | 278 | 250 | 278 | 234 |
| 4. Pigment Bonding Agent Material | | | | | |
| Z6020 Silane[4/] | — | — | 2 | — | — |
| TEPA[5/] 10% solution | 10 | — | — | — | — |
| Urea | — | — | — | — | 3 |
| Formaldehyde 37% | — | — | — | — | 11 |
| 5. Dispersion or Micronizing | | | | | |
| Method | Sand | Sand | Ball | Ball | Sand |
| Time, hours approx. | 36 | 48 | 60 | 36 | 24 |
| Temperature | 28 | 28 | 28 | 28 | 28 |
| Average Particle Size Diameter (Microns) | <0.2 | <0.2 | <0.2 | <0.2 | <0.2 |
| 6. Separation | | | | | |
| Screening (X) | X | X | X | X | X |
| 7. Water Dilution | 200 | 200 | 200 | 200 | 200 |
| 8. Yield | | | | | |
| Aqueous Pigment Dispersion | 500 | 550 | 500 | 550 | 500 |

TABLE 9-continued

Preparation of Intraleucospheruloid Pigment Combinations
(parts by weight)

| Example No. 9 | 1 | 2 | 3 | 4 | 5 |
|---|---|---|---|---|---|
| B. Polymerization Step | | | | | |
| 9. Surface Active Agent Material* | | | | | |
|   a. Quantity, type | 45[3/] | 15[2/] | 20[1/] | 40[3/] | 20[1/] |
|   b. Quantity, type | — | 30[3/] | 20[3/] | — | — |
|   Water | 55 | 48 | 60 | 60 | 80 |
|   Acetic Acid | — | 7 | — | — | — |
| 10. Pigment Bonding Agent Material | | | | | |
|   TEPA[5/] 10% solution | — | 10 | — | — | — |
|   PEI600[6/] | — | — | 10 | — | — |
| 11. Monomer Material Non Crosslinking | | | | | |
|   Styrene | 40 | 10 | — | 40 | 20 |
|   Methylmethacrylate | — | 40 | 40 | — | 25 |
|   Diethylaminoethylmethacrylate | 5 | — | 5 | 5 | — |
| 12. Polymerization Initiator | | | | | |
|   AZDN[7/] | 2 | — | 2 | 2 | 2 |
|   Cumene hydroperoxide | — | 2 | — | — | — |
| 13. Polymerization Conditions | | | | | |
|   Time, hours | 4 | 4 | 4 | 4 | 4 |
|   Temperature, °C. | 80 | 80 | 80 | 80 | 80 |
|   Conversion Approx. 100% (X) | X | X | X | X | X |
| 14. Intraleucospheruloid Pigment Dispersion | | | | | |
|   Yield | 645 | 710 | 655 | 695 | 645 |
|   Latex (X) | — | X | — | X | — |

*Capable of effecting emulsion polymerization.
[1/]Sodium salt of a sulfate ester of an alkylphenoxy poly(ethyleneoxy) ethanol (28% active).
[2/]Substituted imidazoline of tall oil (100% active)
[3/]Octylphenoxy polyethoxy ethanol (70% active)
[4/]N-2- aminoethyl (-3-aminopropyl) trimethoxysilane, manufactured by Dow
[5/]Tetraethylenepentamine
[6/]Polyethyleneimine solution (R) Dow Chemical Company
[7/]Azobisisobutyronitrile

TABLE 10

Preparation of Intraleucospheruloid Pigment Combinations
(parts by weight)

| Example No. 10 | 1 | 2 | 3 | 4 | 5 |
|---|---|---|---|---|---|
| A. Micronizing Step | | | | | |
| 1. Pigment Class or Trade Name | Celite 281 | HiSil 233 | HiSil 404 | Cab-P-Sil H5 | Silene EF |
|   Pigment, dry basis | 50 | 40 | 40 | 40 | |
| 2. Surface Active Agent Material* | | | | | |
|   Tamol SN[1/] | 2 | — | — | — | 2 |
|   Duponol ME[2/] | 2 | — | — | — | 2 |
|   Triton X 405[3/] | 10 | 10 | 60 | 10 | 10 |
|   Ammonium Hydroxide 28% | 2 | — | — | — | 2 |
|   Acetic Acid | — | 5 | 5 | 5 | — |
| 3. Water | | | | | |
|   Quantity | 283 | 285 | 285 | 285 | 293 |
| 4. Pigment Bonding Agent Material | | | | | |
|   Monazoline T[4/] | — | 10 | 10 | 10 | — |
|   Z6020 Silane[5/] | 1 | — | — | — | 1 |
| 5. Dispersion or Micronizing | | | | | |
|   Method | Ball | Sand | Ball | Sand | Sand |
|   Time, hours approx. | 36 | 24 | 36 | 24 | 24 |
|   Temperature | 28 | 28 | 28 | 28 | 28 |
|   Average Particle Size Diameter (microns) | <0.2 | <0.02 | <0.2 | <0.2 | <0.2 |
| 6. Separation | | | | | |
|   Screening (X) | X | X | X | X | X |
| 7. Water Dilution | 200 | 200 | 200 | 200 | 200 |
| 8. Yield | | | | | |
|   Aqueous Pigment Dispersion | 550 | 550 | 600 | 550 | 550 |
| B. Polymerization Step | | | | | |
| 9. Surface Active Agent* | | | | | |
|   a. Quantity, type | 12[2/] | 30[3/] | — | 40[3/] | 10[2/] |
|   b. Quantity, type | 20[3/] | — | — | — | 20[3/] |
|   Water | 68 | 70 | 100 | 60 | 70 |
| 10. Pigment Bonding Agent Material | | | | | |
|   TEPA[6/] 10% solution | — | — | 10 | — | — |
| 11. Monomer Material Non Crosslinking | | | | | |
|   Vinyltoluene | 30 | 45 | — | 20 | 50 |
|   Cyclohexylmethacrylate | 10 | — | 45 | 20 | — |
|   Acrylonitrile | 5 | — | — | 5 | — |
| 12. Polymerization Initiator | | | | | |

TABLE 10-continued

Preparation of Intraleucospheruloid Pigment Combinations
(parts by weight)

| Example No. 10 | 1 | 2 | 3 | 4 | 5 |
|---|---|---|---|---|---|
| AZDN[7/] | — | 2.5 | 2.5 | 2.5 | — |
| Potassium Persulfate | 2.5 | — | — | — | 2.5 |
| Sodium Bisulfite | 1.25 | — | — | — | 1.25 |
| 13. Polymerization Conditions | | | | | |
| Time, hours | 6 | 5 | 5 | 5 | 6 |
| Temperature, °C. | 70 | 80 | 80 | 80 | 70 |
| Conversion Approx. 100% (X) | X | X | X | X | X |
| 14. Intraleucospheruloid Pigment Dispersion | | | | | |
| Yield | 695 | 695 | 755 | 695 | 700 |

*capable of effecting emulsion polymerization
[1/] sodium salt of condensed napthalene sulfonic acid
[2/] sodium lauryl sulfate (100% active)
[3/] octylphenoxy polyethoxy ethanol (70% active)
[4/] substituted imidazoline of tall oil (100% active)
[5/] N- 2-aminoethyl-(-3-aminopropyl) trimethoxysilane, manufactured by Dow
[6/] tetrethylenepentamine
[7/] azobisisobutyronitrile
Celite 281 Tradename for Johns-Manville Corp. natural silica
HiSil 233 Tradename for PPG Industries precipitated silica - reinforcing grade
HiSil 404 Tradename for PPG Industries precipitated silica - paper grade
Cab-O-Sil Tradename for Cabot Corporation pyrogenic silica
Silene EF Tradename for PPG Industries precipitated silica, calcium modified

TABLE 11

Preparation of Intraleucospheruloid Pigment Combinations
(parts by weight)

| Example No. 11 | 1 | 2 | 3 | 4 | 5 |
|---|---|---|---|---|---|
| A. Micronizing Step | | | | | |
| 1. Trade Name | Al-Sil-Ate HO | Excelopax zirconium silicate | Reinforcing Paper Grade Wet PP Silica | Ludox Grade Wet PP Silica | Colloidal Silica HS 4 |
| Pigment, dry basis | 30 | 40 | 35 | 35 | 40 |
| 2. Surface Active Agent* Material | | | | | |
| Alipal CO 433[1/] | 10 | 10 | — | — | — |
| Duponol ME[2/] | 1 | 1 | 2 | — | — |
| Triton X 400[3/] | — | — | — | — | — |
| Triton X 405[4/] | — | — | 10 | 10 | — |
| Acetic Acid | — | — | — | — | — |
| Ammonium Hydroxide 28% | 2 | 2 | 2 | 2 | — |
| 3. Water | | | | | |
| Quantity | 255 | 245 | 249 | 251 | 260 |
| 4. Pigment Bonding Agent Material | | | | | |
| Armac T[5/] | 2 | 2 | 2 | 2 | — |
| 5. Dispersion or Micronizing | | | | | |
| Method | Sand | Sand | Sand | Sand | — |
| Time, hours approx. | 24 | 48 | 24 | 24 | — |
| Temperature | 28 | 28 | 28 | 28 | 28 |
| Average Particle Size Diameter (microns) | <0.2 | <0.2 | <0.02 | <0.2 | <0.02 |
| 6. Separation | | | | | |
| Screening (X) | X | X | X | X | X |
| 7. Water dilution | 200 | 300 | 200 | 200 | 200 |
| 8. Yield | | | | | |
| Aqueous Pigment Dispersion | 500 | 600 | 500 | 500 | 500 |
| B. Polymerization Step | | | | | |
| 9. Surface Active Agent* | | | | | |
| a. Quantity, type | 10[2/] | 10[2/] | 10[1/] | 10[2/] | 40[5/] |
| b. Quantity, type | 20[5/] | 20[5/] | 30[5/] | 20[5/] | — |
| Water | 70 | 70 | 60 | 70 | 60 |
| 10. Pigment Bonding Agent Material | | | | | |
| TEPA[6/] 10% solution | — | — | — | — | 10 |
| 11. Monomer Material Non Crosslinking | | | | | |
| Styrene | 40 | — | 20 | 20 | 21 |
| 4 Vinylpyridine | — | — | — | — | 10.5 |
| Methacrylic Acid | — | 2 | — | — | 8.5 |
| Acrylonitrile | 10 | — | 5 | 5 | — |
| Methylmethacrylate | — | 48 | 20 | 20 | 30 |
| 12. Polymerization Initiator | | | | | |
| AZDN[7/] | 2 | 2 | 2 | 2 | — |
| Potassium Persulfate | — | — | — | — | 3 |
| Sodium bisulfite | — | — | — | — | 1.5 |
| 13. Polymerization Conditions | | | | | |
| Time, hours | 4 | 4 | 4 | 4 | 6 |
| Temperature, °C. | 80 | 80 | 80 | 80 | 70 |
| Conversion Approx. 100% (X) | X | X | X | X | X |

TABLE 11-continued

Preparation of Intraleucospheruloid Pigment Combinations
(parts by weight)

| Example No. 11 | 1 | 2 | 3 | 4 | 5 |
|---|---|---|---|---|---|
| 14. Intraleucospheruloid Pigment Dispersion | | | | | |
| Yield | 650 | 750 | 645 | 645 | 680 |
| Latex (X) | — | — | X | X | X |

*Capable of effecting emulsion polymerization.
[1]/sodium salt of a sulfate ester of an alkylphenoxy poly(ethyleneoxy) ethanol (28% active)
[2]/sodium lauryl sulfate (100% active)
[3]/stearyl dimethyl benzyl ammonium chloride (82% active)
[4]/octylphenoxy polyethoxy ethanol (70% active)
[5]/N-tallow amine acetate (100% active)
[6]/tetraethylenepentami
[7]/azobisisobutyronitrile

TABLE 12

Preparation of Intraleucospheruloid Pigment Combinations
(parts by weight)

| Example No. 12 | 1 | | 2 | |
|---|---|---|---|---|
| A. Micronizing Step | | | | |
| 1. Trade Name | HiSil 233 | TiPure R941 Slurry | Hi-Sil 404 | Zirconium Oxide |
| Pigment, dry basis | 20 | 40 | 20 | 40 |
| 2. Surface Active Agent* Material | | | | |
| Duomeen T[1]/ | | 20 | | — |
| Triton X 405[2]/ | | — | | 10 |
| Alipal CO 433[3]/ | | — | | 20 |
| Acetic Acid | | 10 | | — |
| Ammonium Hydroxide 28% | | — | | 10 |
| 3. Water | | | | |
| Quantity | | 310 | | 300 |
| 4. Pigment Bonding Agent Material | | | | |
| Titanium Tetrachloride | | 20 | | — |
| 5. Dispersion or Micronizing | | | | |
| Method | | Ball | | Sand |
| Time, hours approx. | | 60 | | 48 |
| Temperature | | 28 | | 28 |
| Average Particle Size Diameter (Microns) | | <0.2 | | <0.2 |
| 6. Separation | | | | |
| Screening (X) | | X | | X |
| 7. Water dilution | | 300 | | 300 |
| 8. Yield | | | | |
| Aqueous Pigment Dispersion | | 700 | | 700 |
| B. Polymerization Step | | | | |
| 9. Surface Active Agent* | | | | |
| a. Quantity, type | | 20[1]/ | | 20[2]/ |
| b. Quantity, type | | — | | 25[3]/ |
| Water | | 70 | | 55 |
| Acetic Acid | | 10 | | — |
| 10. Pigment Bonding Agent Material | | | | |
| PEI 600[4]/ | | — | | 20 |
| 11. Monomer Material Non Crosslinking | | | | |
| Methylmethacrylate | | 10 | | 15 |
| Styrene | | 40 | | 35 |
| Dimethylaminoethylmethacrylate | | — | | 5 |
| 12. Polymerization Initiator | | | | |
| AZDN[5]/ | | 3 | | 3 |
| 13. Polymerization Conditions | | | | |
| Time, hours | | 5 | | 5 |
| Temperature, °C. | | 80 | | 80 |
| Conversion Approx. 100% (X) | | X | | X |
| 14. Intraleucospheruloid Pigment Dispersion | | | | |
| Yield | | 850 | | 875 |
| Latex (X) | | X | | — |

*Capable of effecting emulsion polymerization.
[1]/N-tallow trimethylene diamine (85% active)
[2]/octylphenoxy polyethoxy ethanol (70% active)
[3]/sodium salt of a sulfate ester of an alkylphenoxy poly(ethyleneoxy)ethanol (28% active)
[4]/polyethyleneimine solution, manufactured by Dow
[5]/azobisisobutyronitrile
HiSil 233 Tradename for PPG Industries precipitated silica, reinforcing grade
HiSil 404 Tradename for PPG Industries precipitated silica, paper grade
TiPure R941 Tradename for Dupont titanium dioxide pigment

TABLE 13

Preparation of Intraleucospheruloid Pigment Combinations
(parts by weight)

| Example No. 13 | 1 | | 2 | |
|---|---|---|---|---|
| A. Micronizing Step | | | | |
| 1. Trade Name | Silene D | Alumina | HiSil 233 | Zinc Oxide |
| Pigment, dry basis | 20 | 30 | 20 | 30 |
| 2. Surface Active Agent Material* | | | | |
| Duponol ME[1/] | | 5 | | 5 |
| Triton X 405[2/] | | 15 | | 15 |
| Ammonium Hydroxide 28% | | 5 | | — |
| 3. Water | | | | |
| Quantity | | 273 | | 280 |
| 4. Pigment Bonding Agent Material | | | | |
| Monaquat TIBC[3/] | | 2 | | — |
| 5. Dispersing or Micronizing Step | | | | |
| Method | | Ball | | Sand |
| Time, hours approx. | | 60 | | 48 |
| Temperature | | 28 | | 28 |
| Average particle size, Diameter Microns | | <0.2 | | <0.2 |
| 6. Separation | | | | |
| Screening (X) | | X | | X |
| 7. Wash Water Dilution | | 250 | | 300 |
| 8. Yield | | | | |
| Aqueous pigment dispersion | | 600 | | 650 |
| B. Polymerization Step | | | | |
| 9. Surface Active Agent* | | | | |
| a. Quantity, type | | 10[1/] | | 10[1/] |
| b. Quantity, type | | 10[2/] | | 10[2/] |
| Water | | 80 | | 80 |
| 10. Pigment Bonding Agent Material | | — | | — |
| 11. Monomer Material Non Crosslinking | | | | |
| Vinyltoluene | | 10 | | 50 |
| Diethylaminoethylmethacrylate | | 5 | | 5 |
| Styrene | | 40 | | — |
| 12. Polymerization Initiator | | | | |
| AZDN[4/] | | 2.5 | | 2.5 |
| 13. Polymerization Conditions | | | | |
| Time, hours | | 5 | | 5 |
| Temperature, °C. | | 80 | | 80 |
| Conversion Approx. 100% (X) | | X | | X |
| 14. Intraleucospheruloid Pigment Dispersion | | | | |
| Yield | | 755 | | 805 |

*Capable of effecting emulsion polymerization
[1/]sodium lauryl sulfate (100%, active)
[2/]octylphenoxy polyethoxy ethanol (70% active)
[3/]substituted imidazoline quaternized with benzyl chloride (100% active)
[4/]azobisisobutyronitrile
Silene D Trade Name for PPG Industries precipitated silica, calcium modified
HiSil 233 Trade Name for PPG Industries precipitated silica, reinforcing grade

TABLE 14

Preparation of Intraleucospheruloid Pigment Combinations
(parts by weight)

| Example No. 14 | 1 | 2 | 3 | 4 | 5 |
|---|---|---|---|---|---|
| A. Micronizing Step | | | | | |
| 1. Trade Name | TiPure R941 Slurry | Zinc Oxide | Alumina | Micro-Cel Calcium Silicate | Cab-O-Sil |
| Pigment, dry basis | 40 | 30 | 40 | 40 | 40 |
| 2. Surface Active Agent* Material | | | | | |
| Triton X 405[1/] | 10 | — | — | 10 | 10 |
| Duponol ME[2/] | — | 2 | 2 | — | 2 |
| Tamol SN[3/] | — | 2 | 2 | 2 | — |
| Tamol 731[4/] | — | 20 | — | — | 20 |
| N-group polymer[5/] | 20 | — | — | — | — |
| SAMV amphoteric copolymer[6/] | — | — | 20 | 20 | — |
| 3. Water | | | | | |
| Quantity | 270 | 241 | 276 | 268 | 278 |
| 4. Pigment Bonding Agent Material | | | | | |
| TEPA[7/] 10% solution | 10 | — | — | — | — |
| PEI 600[8/] | — | 5 | — | — | — |
| Urea/formaldehyde condensate[9/] | — | — | 10 | 10 | — |
| 5. Dispersing or Micronizing Step | | | | | |
| Method | Sand | Ball | Sand | Sand | Sand |
| Temperature | 28 | 28 | 28 | 28 | 28 |
| Time, hours, approx | 48 | 36 | 36 | 24 | 36 |
| Average particle size Diameter (microns) | <0.2 | <0.2 | <0.2 | <0.2 | <0.2 |
| 6. Separation | | | | | |

TABLE 14-continued

Preparation of Intraleucospheruloid Pigment Combinations
(parts by weight)

| Example No. 14 | 1 | 2 | 3 | 4 | 5 |
|---|---|---|---|---|---|
| Screening (X) | X | X | X | X | X |
| 7. Wash Water Dilution | 250 | 200 | 250 | 250 | 250 |
| 8. Yield | | | | | |
| Aqueous Pigment Dispersion | 600 | 500 | 600 | 600 | 600 |
| B. Polymerization Step | | | | | |
| 9. Surface Active Agent* Material | | | | | |
| a. Quantity, type | $40^{1/}$ | $10^{2/}$ | $20^{1/}$ | $10^{2/}$ | $10^{1/}$ |
| b. Quantity, type | — | — | $10^{21}$ | — | $10^{2/}$ |
| Water | 50 | 85 | 65 | 85 | 75 |
| Ammonium Hydroxide 28% | 10 | 5 | 5 | 5 | 5 |
| 10. Pigment Bonding Agent Material | | | | | |
| TEPA$^{7/}$ 10% solution | — | — | 10 | — | — |
| PEI 600$^{8/}$ | 5 | — | — | — | — |
| Aminoplast Material$^{9/}$ | — | — | — | — | 10 |
| 11. Monomer Material Non Crosslinking | | | | | |
| Methylmethacrylate | 40 | 20 | — | 20 | 45 |
| Cyclohexylmethacrylate | — | 20 | 40 | 25 | — |
| Acrylonitrile | 5 | 5 | 5 | — | 5 |
| 12. Polymerization Initiator | | | | | |
| AZDN$^{10/}$ | 2 | 2 | 2 | 2 | 2 |
| 13. Polymerization Conditions | | | | | |
| Time, hours | 5 | 5 | 5 | 5 | 5 |
| Temperature, ° C. | 80 | 80 | 80 | 80 | 80 |
| Conversion Approx. 100% (X) | X | X | X | X | X |
| 14. Intraleucospheruloid Pigment Dispersion | | | | | |
| Yield | 745 | 645 | 755 | 745 | 750 |
| Latex (X) | X | — | — | — | X |

*Capable of effecting emulsion polymerization
$^{1/}$octylphenoxy polyethenoxy polyethoxy ethanol (70% active)
$^{2/}$sodium lauryl sulfate (100% active)
$^{3/}$sodium salt of condensed napthalene sulfonic acid
$^{4/}$sodium salt of polymeric carboxylic acid (100% active)
$^{5/}$4-vinylpyridine homopolymer
$^{6/}$copolymer of styrene, acrylonitrile, methacrylic acid and 4-vinylpyridine, ratio 25/10/29/36
$^{7/}$tetraethylenepentamine
$^{8/}$polyethyleneimine solution, manufactured by Dow
$^{9/}$condensation product of reaction of 1.8 mole formaldehyde with 1.0 mole urea (aq. disp.)
$^{10/}$azobisisobutyronitrile
TiPure R941 Tradename for DuPont titanium dioxide pigment
Micro-Cel Tradename for Johns-Manville Corp. calcium silicate
Cab-O-Sil Tradename for Cabot Corporation pyrogenic silica

Isolation and Soft Powdering Procedures

The intraleucospheruloid pigments produced in the foregoing Examples are produced as aqueous dispersions or latices and such products may either be retained and used in that form or may be further processed to give the product in other forms such as wet presscake, dry powder, or by special supplementary treatment as soft powder products applicable in the case of the crosslinked insoluble pigment latices.

Except in those cases where the intraleucospheruloid latex or dispersion is spray dried or drum dried as is, for efficient separation from the aqueous phase, filtration is essential. As the latices of the invention would pass through or clog up a filter, to enable filtration it is necessary to effect coagulation of the latex particles into agglomerates capable of separation from the aqueous phase by filtration and washing methods. For the purposes of this invention this may be accomplished by either breaking the emulsion by pH adjustment with water soluble organic and inorganic compounds, by reacting the intraleucospheruloid pigment particles with chemical additives capable of reaction with functional groups contained on said intraleucospheruloid pigments, or by other methods. The following Examples are illustrative but not restrictive of the methods which may be employed.

Example 1 (Coagulation with inorganic acid and soft powder procedure)

The product from Table 1-3 was charged to a vessel equipped with thermometer, agitator and baffle for producing turbulent agitation together with 1500 ml. of water. With agitation 50 ml. of glacial acetic acid as a 20% aqueous solution was introduced followed by 25 ml. of a 33% solution of Aerosol OT in 140 Naphtha.

Agitation was continued and the product was heated to 75°–80° C. during 2 to 3 hours and held at this temperature for a further 3 hours. During the course of the acidification the intraleucospheruloid pigment coagulated into soft flocculent filterable agglomerations. The product was then filtered, washed with warm water until neutral and finally dried at 60°–70° C. in a convection type oven to yield 120 grams of a fluffy soft white intraleucospheruloid pigment which requires little or no mechanical grinding to render it suitable as an excellent white pigment for oleophilic paint systems, thermoplastic materials and related purposes.

Example 2 (Soft powder procedure — product retained as presscake

The procedure of Example 1 was followed with the exception that the oven drying step was omitted and the intraleucospheruloid pigment retained in its wet presscake form. In this form it is especially suitable for incorporation into aqueous systems such as latex paints and related usages, or as a base white pigment for further production of colored compounds.

Example 3 (Coagulation of product with alcohol)

The product of Table 2—2 was charged to a vessel equipped with thermometer, agitator and baffle for producing turbulent agitation together with 100 ml. water with agitation, 200 ml. of isopropylalcohol was slowly introduced to give a voluminous white coagulum. The agitation was continued and the vessel heated to 70°-75° C. during 2 to 3 hours and held at that temperature for a further 2 hours followed by filtration. The product may be used as a wet presscake or dried in a convection type oven at 60–70° C. to yield 100 grams of a soft white intraleucospheruloid pigment which may be used as in the previous examples.

Example 4 (Coagulation of product with inorganic acid)

The product of Table 3-1 was charged to a reaction vessel equipped with thermometer agitator and baffle for producing turbulent agitation together with 1000 ml. of water. With agitation 25 ml. of sulfuric acid as a 10% solution was introduced, followed by 25 ml. of a 33% solution of Aerosol OT in Naphtha 140. Coagulation of the intraleucospheruloid pigment was noticed almost as soon as the acidification commenced.

The reaction vessel was then heated to 75°-80° C. and held at that temperature range for 3-4 hours. The product was then filtered and washed with water until neutral. The product may be used as a wet presscake material in aqueous systems such as latices, paint, production of color lakes or in paper coloration and opacification or it may be dried by any conventional means such as convection oven. If desired the wet presscake material may be spray dried by adjusting the solids content to around 20% and conversion into a suitable slurry by conventional mechanical methods.

Example 5 (Coagulation by opposing functional groups)

The product of Table 4-2 was charged to a reaction vessel equipped with thermometer, agitator and baffle for producing turbulent agitation together with 500 ml. of water. With agitation the product of Table 2-4 was run in slowly followed by 25 ml. of a 33% solution of Aerosol OT in Naphtha 140. The reaction vessel was then heated during 2 to 3 hours to 70°-75° C. and held at that temperature range for 2 to 3 hours to effect reaction of the basic and acidic functional groups of the components. The intraleucospheruloid pigment combination may be isolated by filtration and washing or may be spray dried directly to yield a spray dried product especially useful in latex and paper products.

Example 6 (Coagulation with inorganic base)

The product of Table 5-1 was charged to a reaction vessel equipped with thermometer, agitator and baffle for producing turbulent agitation together with 1000 ml. of water. With agitation dilute sodium hydroxide solution was run in, followed by 25 ml. of a 33% solution of Aerosol OT in Naphtha 140. Heat was applied and continued during 2 to 3 hours until within the range of 75°-80° C. The temperature was maintained at this level for 3-4 hours until coagulation was complete.

The product was then filtered, washed alkali free and dried in a convection type oven at 60°-70° C. to yield 155 grams of a soft intensely white intraleucospheruloid pigment having excellent characteristics in thermoplastic formulations, nonaqueous paint systems, etc.

Or the product may be retained in wet presscake form for use in any aqueous system such as paper opacification, latex paints and similar purposes.

Example 7 (Coagulation with organic amine)

The product of Table 7-2 was charged to a reaction vessel equipped with thermometer, agitator and baffle for producing turbulent agitation together with 700 ml. of water. Slowly added was 100 ml. of a 25% solution of Armac T. After the addition was completed the temperature was raised to 75°-80° C. and held there for 2-3 hours. The precipitated intraleucospheruloid pigment product was then filtered, washed and dried in a convection type oven at 60–70° C. to yield 140 grams of a soft white intraleucospheruloid pigment.

Example 8 (Soft powder procedure)

The procedure of Example 1 was followed with the exception that in place of the 33% solution of Aerosol OT in 140 naphtha was used 40 ml. of a 10% solution of sorbitan monolaurate in Solvent Naphtha. An extremely soft product was obtained.

Example 9 (Soft powder procedure)

The procedure of Example 3 was followed with the exception that in place of the isopropyl alcohol was used 40 ml. of a 20% solution of diamyl sodium sulfosuccinate in Solvent Naphtha. An extremely soft product was obtained.

Example 10 (Soft powder procedure)

The procedure of Example 4 was followed with the exception that in place of the 33% solution of Aerosol OT in Naphtha 140 was used 40 ml. of a 10% solution of polyethylene sorbitan monolaurate in Solvesso 140. An extremely soft product was obtained.

Example 11 (Soft powder procedure)

The procedure of Example 5 was followed with the exception that in place of the 33% solution of Aerosol OT in naphtha 140 was used 40 ml. of a 10% solution of octylphenoxydimethoxyethanol in Solvesso 140.

Example 12 (Soft powder procedure)

The procedure of Example 7 was followed with the exception that in addition to the 100 ml. of 25% Armac T solution was used 40 ml. of a 20% solution of di-tertiary-octyl sodium sulfosuccinate in Stoddard solvent. An extremely soft product was obtained.

Example 13 (Sequential addition of monomers)

the procedure of Example A was followed with the exception that after the polymerization was completed the reaction vessel was cooled to 40°-45° C. and there was then introduced a further monomer mixture containing 10 grams of styrene and 5 grams of 50% divinylbenzene. The mixture was stirred for one hour to ensure efficient absorption of the monomers by the intraleucospheruloid particles and then 2 grams of cumene hydroperoxide added and the temperature raised to 75°-80° C. during 1 hour and held there for 6-7 hours. On cooling an intraleucospheruloid pigment latex was obtained containing spheruloids of polymer cross-linked to essential insolubility in physical solvents, said insoluble cross-linked polymer spheruloids containing the leuco pigment material embedded therein.

Example 14 (Sequential addition of monomers)

The product of Example B was allowed to cool to 40°-45° C. and at this point 10 grams of ethyleneglycoldimethacrylate added and the mixture agitated for 1 hour to ensure efficient absorption of the cross-linking monomer into the intraleucospheruloid particles. A solution of 1.5 grams of potassium persulfate in 50 ml. of water was then added followed by 0.75 grams of sodium bisulfite dissolved in 25 ml. of water. The temperature was then raised to 65°-70° C. and held there for 7 hours. On cooling an intraleucospheruloid pigment was obtained cross-linked to essential insolubility in all physical solvents.

While only the two preceding Examples are given in detail to illustrate the step-wise nature of the sequential addition of the monomers during polymerization, it is possible to use this method to prepare insoluble intraleucospheruloid pigment compositions from any of the examples given, by one skilled in the art, guided by this disclosure.

Example 15 (Polymerization using drying oils as cross-linking material)

The procedure of Table 1, Example 3 was followed except that in place of the 20 grams of 50% divinylbenzene, was added 18 grams of methylmethacrylate containing 2 grams of Oiticica Oil dissolved therein and the polymerization time was extended to 8 hours at 70° C. An insoluble intraleucospheruloid pigment was obtained cross-linked by virtue of the drying oil polymerized therein.

Example 16 (Coagulation of acidic intraleucospheruloid pigment with amine)

The product from Table 4, Example 4, was diluted with an equal weight of water and with agitation a solution of 20 grams of Duomac T (N-tallow trimethylene diacetate) in 100 grams of water run in. The coagulated intraleucospheruloid composition was then heated to 80° C. and held there for 4 hours to complete the reaction, following which it was separated from the serum by filtration and washing and air dried to yield a very soft oleophilic intraleucospheruloid pigment.

Example 17 (Coagulation of acidic intraleucospheruloid pigment with imine)

The procedure of the preceding Example was repeated with the exception that in place of the Duomac T was used 25 grams of a water soluble polyethylenimine PEI 18, manufactured by Dow. The intraleucospheruloid pigment so produced contains polyethylenimine groups attached thereto and is substantive to cellulosic materials by virtue of same.

Example 18 (Coagulation of basic intraleucospheruloid pigment with acids)

The product from Table 2, Example 1, was diluted with an equal volume of water and with stirring, was added a solution of 30 grams of Tamol 731, a polymeric carboxylic acid to effect coagulation by reaction with the amine groups on the intraleucospheruloid pigment. Following the addition the product was heated to 75°-80° C. and held at this temperature for 4 hours, then filtered to separate the serum from the coagulum. The product may be retained as wet presscake for use in aqueous based systems or flushing into oil based systems or may be dried to yield an intraleucospheruloid pigment suitable for direct addition to oil based or thermoplastic systems.

Example 19 (Coagulation of intraleucospheruloid pigment with bases)

The product of Table 7, Example 4 was diluted with an equal volume of water in a vessel equipped with a stirrer and a dilute solution of ammonium hydroxide added sufficient to adjust the pH to between 9 and 10. The coagulated product was then heated during 1 hour to 75°-80° C. and held at this temperature for 4 hours, followed by filtration to remove the serum from the coagulum and then washed and oven dried. A soft white intraleucospheruloid pigment was obtained which may be used in oil based and thermoplastic systems.

Example 20 (Coagulation of intraleucospheruloid pigment with acids)

The product of Table 8, Example 3 was diluted with an equal volume of water in a vessel equipped with a stirrer, and coagulated by the addition of 50 grams of a styrene, methacrylic acid, acrylonitrile copolymer (ratio 25/65/10) as a 20% aqueous solution of the ammonium salt. Following the addition the reaction was heated to 80° C. and held at this temperature for 4 hours to complete the reaction. The intraleucospheruloid may be recovered by spray drying, or by filtration and retaining as a wet presscake, or the presscake may be dried, depending on the end use desired for same.

Example 21 (Coagulation by neutralization and salting out)

The product of Table 4, Example 4 was diluted with an equal volume of water and the pH adjusted to 7.0 with dilute ammonium hydroxide. A solution of 25 grams of zinc chloride in 100 ml. of water was then run in with stirring and the coagulated intraleucospheruloid pigment heated to 80° C. during 1 hour to complete the reaction, and then filtered, washed and dried to yield an intraleucospheruloid pigment useful in oil based and thermoplastic systems.

Example 22 (Coagulation with salts)

The product of Table 5, Example 2 was diluted with an equal volume of water and then coagulated by the addition of a solution of 50 grams of aluminum sulfate dissolved in 200 ml. of water added while stirring. The coagulated product was then heated to 75°-80° C. during 1 hour, filtered, washed and dried as in the preceding Example to yield a high opacity white intraleucospheruloid pigment suitable for use in oil based and thermoplastic systems.

Other Examples

It was shown in Examples 13 and 14 that the spheruloids of the composition may be produced initially as noncross-linked particles, and be thereafter cross-linked by absorbing cross-linking monomer thereinto and subjecting the same to further polymerization. It has thus been shown that any of the noncross-linked products examplified may be prepared in cross-linked form by the concurrent or sequential polymerization therewith of cross-linking monomers.

Since the criteria common to the noncross-linked and cross-linked embodiments of the invention are that the products be insoluble in the vehicle of intended use and have a different refractive index than the latter, it will be apparent from the foregoing that the cross-linking monomers, in the Examples producing cross-linked products, may also be replaced by noncross-linking monomers, where the criteria will be satisfied by the environment of use.

While there have been described herein what are at present considered preferred embodiments of the invention, it will be obvious to those skilled in the art that modifications and changes may be made therein without departing from the essence of the invention. For example, the micronized materials in liquid media may be stored after preparation, especially if they contain adequate emulsifier, such previously prepared micronized dispersions may be blended, preferably under further micronization, to provide in liquid media micronized mixed pigments for the process; the modes of combining, heating and polymerizing the ingredients may be varied dependent upon the volumes of materials being handled in manners known to those skilled in the emulsion polymerization art; etc. It is therefore understood that the exemplary embodiments are illustrative and not restrictive of the invention, the scope of which is defined in the appended claims, and that all modifications that come within the meaning and range of equivalents of the claims are intended to be included therein.

This applicaton is one of the following series of applications:

| Number | Case Number | Serial Number | Title |
|---|---|---|---|
| First | 90-A | 712,257 | Intrachromospheruloid Pigments and Processes for Producing Same |
| Second | 90-B | 712,254 | Intraleucospheruloid Pigments and Processes for Producing Same |
| Third | 90-C | 712,255 | Intrachromospheruloid/Inorganic Pigment Compositions and Processes for Producing Same |
| Fourth | 90-D | 712,256 | Intraleucospheruloid/Organic Color Pigment Compositions and Processes for Producing Same |
| Fifth | 90-E | 712,252 | Intrachromospheruloid/Intraleucospheruloid Pigment Compositions and Processes for Producing Same |
| Sixth | 90-F | 712,253 | Intrachromoleucospheruloid Pigment Compositions and Processes for Producing Same |

All of the cases of this series are herein incorporated by reference. The titles of the respective cases indicate the lines of division between the subjects matter thereof. Thus the product of the first case consists essentially of transparent emulsion polymer particles, preferably cross-linked to insolubility in physical solvents and having primary particles of colloidal size (spheruloids), enhancing the optical properties of still smaller particles of organic color pigment (chromo pigment) embedded within them (intra). The second case, in lieu of the organic color pigment has embedded within its spheruloids inorganic white pigment (leuco pigment) enhanced thereby. The product of the third case is a special combination of intrachromospheruloid pigment affixed to leuco pigment and coloring the light reaching and reflected from the latter. The product of the fourth case is a special combination of intraleucospheruloid having chromo pigment material affixed thereto and illuminating the same. The product of the fifth case is a special combination of intrachromospheruloid and intraleucospheruloid pigments bonded together giving mutually enhanced tinctorial properties. The product of the sixth case differs from the foregoing in that its spheruloids have embedded therein and enhance the tinctorial effects of composite particles of essentially transparent organic color (chromo) and inorganic white (leuco) components wedded to each other.

Also incorporated by reference herein are our copending applications Ser. Nos. 712,213 and 712,160 (Cases 88 and 89) filed concurrently herewith and respectively entitled "Improved Vinylic Filler Products and Processes for Producing Same" and "Improved Vinylic Filler Pigments and Processes for Producing Same", which copending applications apply to materials different from those concerned in the above listed series of applications, i.e. non-intrachromo- and non-intraleuco- pigment materials, the applicants' soft powdering techniques constituting parts of certain combinations disclosed and claimed in the present application.

We claim:

1. A process for producing insoluble intraleucospheruloid pigment composition, which process comprises, in combination:
   (a) providing in liquid medium a particulate pigment composition consisting essentially of inorganic leuco pigment composition dispersed in said liquid medium with 0–100% by weight of the total of surface active agent material set forth in (c), said inorganic pigment composition being selected from the class consisting of the inorganic opaque white pigments and the inorganic transparent white pigments having refractive indicies different from that of the cross-linked organic polymer produced by step (d), and combinations of any two or more of the foregoing and having primary particles of an average size less than 0.2 microns in diameter
   (b) forming an aqueous emulsion polymerization system consisting essentially of (1) the composition of (a), (2) the balance, if any, of 100% of the total of surface active agent material set forth in (c), (3) monomer material selected in a ratio of said monomer material to said pigment composition lying in the range of 100:1 to 1:20 by weight, said monomer material being ethylenically unsaturated and being monomer material selected from the class consisting of (i) monomer material polymerizable through a single ethylenically unsaturated group in the amount of 0% to 99.8% by weight of said added monomer material and (ii) monomer material polymerizable through a plurality of ethylenically unsaturated groups in an amount, in the range of 0.2 to 100% by weight of said added monomer material, sufficient to produce polymer cross-linked to essential insolubility in any physical solvent and (4) emulsion polymerization initiator in an effective amount in the range of 0.2 to 10% by weight of the said added monomer material dispersed in an aqueous medium;
(c) the ratio of the total of the surface active agent material present after (b) to said particulate pigment composition and monomer material lying in the range of 2:1 to 1:40 by weight and said total of surface active agent material being selected from the class of polymeric and nonpolymeric surface active agents and combinations thereof capable of effecting emulsion polymerization of the selected ethylenically unsaturated monomer material to yield polymer particles with the inorganic pigment provided in step (a) imbedded therein;
(d) effecting polymerizaton of the combination formed in (b) at sufficient temperatures in the range of 0° to 200° C. for sufficient time in the range of a few minutes to 24 hours to permit the polymerization to proceed far enough in the range from 50 to 100% conversion by weight of said monomer material to produce in aqueous dispersion an intraleucospheruloid pigment composition consisting essentially of spheruloids of organic polymer material cross-linked to essential insolubility in any physical solvent, having primary particles of an average size not exceeding 4 microns in diameter, and having embedded in said spheruloids the still smaller size particles of said inorganic particulate pigment composition, and
(e) recovering said intraleucospheruloid pigment composition.

2. A process according to claim 1, in which the ethylenically unsaturated monomer material in step (b) comprises several portions sequentially added and sequentially polymerized in step (d), one or more of said several portions comprising monomer material polymerizable through at least two ethylenically unsaturated groups in a sufficient proportion to cross-link the polymer of the intraleucospheruloids to essential insolubility in any physical solvent.

3. A process according to claim 1, in which the monomer material in step (b) (ii) having a plurality of polymerizable ethylenically unsaturated groups is comprised essentially of material copolymerizable with vinyl monomers and selected from the unsaturated conjugated drying oils and their acids and derivatives of the foregoing, the ratio of said drying oil material to the other monomer material in step (b) lying in the range of 0.2:99.8 to 20:80 by weight.

4. A process according to claim 1, in which the inorganic pigment composition provided in step (a) has primary particles of an average size less than 0.1 micron in diameter.

5. A process according to claim 1, wherein (f) said inorganic pigment composition supplied for step (a) is a relatively coarse particulate inorganic pigment composition and in step (a) is micronized in the liquid medium with the aid of any surface active agent present therein until said inorganic pigment composition has primary particles of an average size less than 0.2 micron in diameter.

6. A process according to claim 5, wherein said inorganic pigment composition supplied for step (a) is micronized therein until said inorganic pigment composition has primary particles of an average size greater than 0.1 micron and less than 0.2 micron in diameter.

7. A process according to claim 5, wherein in step (f) the liquid medium in which the inorganic leuco pigment composition is micronized consists essentially of an aqueous solution of from 1% to 10% by weight of the total of surface active agent set forth in (c).

8. A process according to claim 5, wherein in step (f) the liquid medium in which the inorganic leuco pigment composition is micronized consists essentially of monomer material employed in step (b), and in which the surface active agent material employed in step (b) is dissolved in sufficient water to provide an emulsion polymerization system in step (b).

9. A process according to claim 5, wherein the said inorganic pigment composition supplied for step (a) is micronized with at least 2% by weight of the pigment bonding agent material set forth in step (a), based on the inorganic pigment composition.

10. A process according to claim 5, wherein said inorganic pigment composition supplied for step (a) is micronized with at least 2% by weight of the nitrogenous material, based on the inorganic pigment composition.

11. A process according to claim 5, wherein the said inorganic pigment composition supplied for step (a) is micronized with at least 2% by weight of the monomer material supplied in step (b) (2), based on the inorganic pigment composition.

12. A process according to claim 11, wherein the said 2% by weight of monomer material consists essentially of amine monomer material.

13. A process according to claim 1, in which the surface active agent material employed in (c) comprises polymeric surface active agent.

14. A process according to claim 13, in which said polymeric surface active agent has basic groups at least in part in the form of water soluble salts.

15. A process according to claim 13, in which said polymeric surface active agent has acidic groups at least in part in the form of water soluble salts.

16. A process according to claim 1, wherein step (e) is practiced by coagulating the intraleucospheruloid pigment produced by step (d), and separating serum from the coagulum to provide the intraleucospheruloid pigment compositon as wet coagulum.

17. A process according to claim 1, which comprises, in step (e) drying the intraleucospheruloid pigment compositions produced by step (d).

18. A process according to claim 1, wherein (g) as a part of step (e) the intraleucospheruloid pigment composition produced in aqueous dispersion in step (d) is modified to contain 0.5 to 35 parts of soft powdering agent per 100 parts of said pigment composition, dry basis by weight.

19. A process according to claim 18, which further comprises (h) as a part of step (e), after step (g), drying the modified composition to obtain the intraleucospheruloid pigment composition in soft powder form.

20. A process according to claim 18, which further comprises (g) as a part of step (e), after step (f), spray drying the modified composition to obtain the intraleucospheruloid pigment composition in particulate soft powder form.

21. A process according to claim 1, which comprises, in step (e), coagulating the aqueous dispersion of intraleucospheruloid pigment composition formed in step (d) with the aid of coagulant selected from the class consisting of
(i) water soluble alcohols,
(ii) pH adjustment materials of the group consisting of water soluble acids and inorganic bases,
(iii) sodium chloride, and (iv) combinations of any two or more of the foregoing.

22. A process according to claim 1, which comprises,
(i) in step (a) combining, with the inorganic pigment composition from 5% to 100% by weight, based on the pigment, of resin selected from the class consisting of (i) water soluble and dispersible aminoplast resins preformed and formed in situ, and (ii) water soluble and dispersible phenoplast resins preformed and formed in situ, and
(ii) thereafter insolubilizing the resin to bond it to the inorganic pigment thereby to facilitate the polymer embedment of the pigment composition in step (d).

23. A process according to claim 1, which further comprises
(i) selecting in step (b) monomer material containing sufficient acidic monomer to provide the intraleucospheruloid pigment with groups selected from the class consisting of acid groups and their alkali metal and ammonium salts, and
(ii) in step (e) causing the said spheruloid pigments to react with water soluble and dispersible organic materials selected from the class consisting of amines and imines and salts thereof.

24. A process according to claim 1, which further comprises
(i) selecting in step (b) monomer material containing sufficient monomer from the class consisting of amine monomers and salts thereof, to provide the intraleuoospheruloid pigment with reactive groups, and
(ii) in step (e) causing the said spheruloid pigments to react with water soluble organic material having groups selected from the class consisting of carboxyl, sulfate and sulfonic acid groups and salts thereof.

25. A process according to claim 1, which further comprises
(i) selecting anionic surface active agent in step (c) to provide the aqueous dispersion in step (d) with anionic surface active agent and
(ii) in step (e) causing the said spheruloid pigments to be coagulated by reacting the combination formed in step (d) with water soluble organic material selected from the class consisting of amines and imines and salts thereof.

26. A process according to claim 1, which further comprises
(i) selecting cationic surface active agent in step (c) to provide the aqueous dispersion formed in steps (d) with cationic surface active agent, and
(ii) in step (e) causing the said spheruloid pigment to be coagulated by reacting the combination formed in step (d) with water soluble organic material having groups selected from the class consisting of carboxyl, sulfate and sulfonic acid groups and salts thereof.

27. A process according to claim 1, which further comprises
(i) selecting in steps (b) monomer material containing sufficient acidic monomer to form spheruloids which contain acidic groups and which after neutralization with water soluble base are coagulable, and
(ii) in step (e) neutralizing with a water soluble base the acidic groups of the combined aqueous dispersion of intraleucospheruloid pigment formed in step (d), and (iii) then coagulating the spheruloids with water soluble coagulant selected from the class consisting of water soluble (i) alkaline-earth metal compounds, (ii) aluminum salts, (iii) zinc salts, (iv) oleophilic amine acid salts, and (v) combination of the foregoing.

28. A process according to claim 1, which further comprises selecting anionic surface active agent in step (c), and in step (e) coagulating the aqueous dispersion of intraleucospheruloid pigments formed in step (d) with water soluble coagulant selected from the class consisting of water soluble (i) alkaline-earth metal compounds, (ii) aluminum salts, (iii) zinc salts, (iv) oleophilic amine acid salts, and (v) combinations of the foregoing.

29. A process according to claim 1, in which the inorganic pigment composition in step (a) consists essentially of silica pigment composition having primary particles of an average size less than 0.2 micron in diameter and titanium dioxide pigment composition having primary particles of an average size in the range of about 0.2 to 0.1 micron in diameter, in a weight ratio in the range of 1:10 to 10:1.

30. A process according to claim 1, in which the inorganic pigment compositon in step (a) consists essentially of silica pigment compositon having primary particles of an average size less than 0.1 micron in diameter and titanium dioxide pigment composition having primary particles of an average size less than 0.2 micron in diameter, in a weight ratio in the range of 1:10 to 10:1.

31. A process according to claim 1, in which the selected inorganic pigment composition in step (a) consists essentially of siliceous pigment selected from the sub-class consisting essentially of (a) wet, and dried, paper grade precipitated hydrated silica pigments having primary particles of an average size in the range of 0.2 to 0.1 micron in diameter, (b) wet, and dried, reinforcing grade precipitated hydrated silica pigments having primary particles of an average size in the range of less than 0.1 micron in diameter, and (c) pyrogenic silica pigment.

32. A process according to claim 1, in which the inorganic pigment composition in step (a) consists essentially of titanium dioxide pigment composition having primary particles of an average size in the range of about 0.2 to 0.1 micron in diameter.

33. A process according to claim 32, in which the inorganic pigment composition in step (a) consists essentially of titanium dioxide pigment and in minor amount pigment selected from the following groups (i) silicas, (ii) alkaline-earth metal silicates, (iii) alkaline-earth metal oxides, (iv) aluminum hydroxide, (v) alumina, (vi) aluminum silicate, (vii) zinc oxide, (viii) zinc silicate, and (ix) combinations of any two or more of the foregoing.

34. A process accoding to claim 1, in which the inorganic pigment composition in step (a) consists essentially of titanium dioxide pigment composition having primary particles of an average size less than 0.1 micron in diameter.

35. A process as claimed in claim 1, in which the ratio in step (c) is selected to produce intraleucospheruloid pigment dispersion in step (d) in the form of a latex.

36. An insoluble intraleucospheruloid pigment consisting essentially of spheruloids of organic polymer material cross-linked to essential insolubility in any physical solvent, said polymer material consisting essentially of polymerized monomer material selected from the class consisting of the monoethylenically unsaturated and polyethylenically unsaturated polymerizable compounds, and said spheruloids having primary particles of an average size not exceeding 4 micron in diameter, and having embedded therein particulate pigment composition consisting essentially of inorganic leuco pigment material, the weight ratio of said organic polymer material to said pigment composition being in the range of 100:1 to 1:20, the inorganic leuco pigment material being selected from the class consisting of the opaque white pigments and the transparent white pigments having refractive indicies different from that of the cross-linked organic polymer of the speruloids and having particles of an average size not exceeding 0.2 micron in diameter.

37. An intraleucospheruloid pigment according to claim 36, in the form of a wet coagulum.

38. An intraleucospheruloid pigment according to claim 36, in powder form.

39. An intraleucospheruloid pigment according to claim 36, in soft powder form.

40. An intraleucospheruloid pigment composition according to claim 36, in which the inorganic pigment material consists essentially of silica pigment composition having primary particles of an average size in the range of about 0.2 to 0.1 micron in diameter in a weight ratio in the range of 1:10 to 10:1.

41. An intraleucospheruloid pigment composition according to claim 36, in which the inorganic pigment material consists essentially of silica pigment composition having primary particles of an average size less than 0.2 micron in diameter and titanium dioxide pigment composition having primary particles of an average size in the range of about 0.2 to 0.1 micron in diameter in a weight ratio in the range of 1:10 to 10:1.

42. An intraleucospheruloid pigment composition according to claim 36, in which the inorganic pigment composition is selected from the class consisting of the following groups (1) siliceous pigment compositions selected from (i) the natural silica pigments, (ii) the precipitated silica pigments, (iii) the pyrogenic silica pigments, (iv) the alkaline-earth metal silicate pigments, (v) the aluminum silicate pigments, (vi) the zinc silicate pigments, (vii) the zirconium silicate pigments, and (viii) combinations of any two or more of the foregoing; (2) titanium dioxide pigment compositions: (3) pigment composition selected from (i) alkaline-earth metal carbonate and sulfate pigments, (ii) alumina pigments, (iii) hydrated aluminum oxide pigments, (iv) antimony oxide pigments, (v) zinc oxide pigments, (vi) zirconium oxide pigments, and (vii) combinations of any two or more of the foregoing, and (4) combinations of any two or more members selected respectively from classes (1), (2) and (3); in which the particulate pigment composition contains from 0 to an equal weight of pigment bonding agent material formed in situ in the presence of at least a part of said pigment composition and selected from the class consisting of water insoluble deposits from (i) water soluble alkali metal silicates, (ii) water soluble titanium compounds, (iii) water soluble and dispersible aminoplasts preformed and formed in situ, (iv) water soluble and dispersible phenoplasts preformed and formed in situ, (v) water soluble and dispersible organic polymers having carboxyl, amine, sulfate and sulfonic acid groups and salts thereof, and (vi) water soluble and dispersible organic silanes; and in which the particulate pigment composition has from 0 to an equal weight of nitrogenous material thereon, said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble polyimines, and (vii) combinations of two or more members of the foregoing.

43. An intraleucospheruloid pigment composition according to claim 42, in which the particulate pigment composition has thereon at least 2%, based on the weight thereof, of said pigment bonding agent material.

44. An intraleucospheruloid pigment compositon according to claim 42, in which the particulate pigment composition has thereon at least 2%, based on the weight thereof, of said nitrogenous material.

45. An intraleucospheruloid pigment composition according to claim 36, in which the inorganic pigment material consists essentially of silica pigment composition selected from the group consisting of (a) wet, and dried, paper grade precipitated hydrated silica pigments having primary particles of an average size in the range of 0.2 to 0.1 micron in diameter, (b) wet, and dried, reinforcing grade precipitated hydrated silica pigments having primary particles of an average size in the range of less than 0.1 micron in diameter, and (c) pyrogenic silica pigment.

46. An intraleucospheruloid pigment composition according to claim 36, in which the inorganic pigment material consists essentially of a titanium dioxide pigment composition having primary particles of an average size in the range of about 0.2 to 0.1 micron in diameter.

47. A pigment composition according to claim 36, in which particles of the intraleucospheruloid pigment composition have on their spheruloids groups selected from the class consisting of the products from acid groups and their alkali metal and ammonium salts of the spheruloids reacted with organic material having groups selected from the class consisting of amine and imine groups and salts thereof.

48. A pigment composition according to claim 36, in which particles of the intraleucospheruloid pigment composition have on their spheruloids groups selected from the class consisting of the products from amines and salts thereof of the spheruloids reacted with organic material having groups selected from the class consisting of carboxyl, sulfate and sulfonic acid groups and salts thereof.

49. An intraleucospheruloid pigment composition according to claim 36, in which the composition further comprises reaction products of anionic surface active agent with organic material having groups selected from the class consisting of amine and imine groups and salts thereof.

50. An intraleucospheruloid pigment compositon according to claim 36, in which the composition further comprises reaction products of surface active agent having groups selected from the class consisting of amine and imine groups and salts thereof, with organic material having groups selected from the class consisting of carboxyl, sulfate and sulfonic acid groups and salts thereof.

51. A pigment composition according to claim 36, in which particles of the intraleucospheruloid pigment composition have on their spheruloids groups selected from the class consisting of acid groups and their alkali metal and ammonium salts and which have formed reaction products with water soluble material selected from the class consisting of (i) the alkaline-earth metal salts, (ii) aluminum salts, (iii) zinc salts, (iv) oleophilic amine salts, and (v) combination of the foregoing.

52. A pigment composition according to claim 36, in which particles of the intraleucospheruloid pigment composition further comprise reaction products of anionic surface active agent with water soluble material selected from the class consisting of (i) alkaline-earth metal salts, (ii) aluminum salts, (iii) zinc salts, (iv)oleophilic amine salts, and (v) combinations of the foregoing.

53. An intraleucospheruloid pigment according to claim 36, in the form of a latex.

54. A process according to claim 1, in which the inorganic pigment composition is selected from the class consisting of the following groups (1) siliceous pigment compositions selected from (i) the natural silica pigments, (ii) the precipitated silica pigments, (iii) the pyrogenic silica pigments, (iv) the alkaline-earth metal silicate pigments, (v) the aluminum silicate pigments, (vi) the zinc silicate pigments, (vii) the zirconium silicate pigments and (viii) combinations of any two or more of the foregoing; (2) titanium dioxide pigment compositions; (3) pigment compositions selected from the class consisting of the following groups (i) alkaline-earth metal carbonate and sulfate pigments (ii) alumina pigments, (iii) hydrated aluminum oxide pigments, (iv) antimony oxide pigments, (v) zinc oxide pigments, (vi) zironium oxide pigments and (vii) combinations of any two or more of the foregoing, and (4) combinations of any two or more members selected respectively from groups of (1), (2) and (3).

55. A process according to claim 1, in which (I) the inorganic pigment contains pigment modifying agent;
(II) said pigment modifying agent being selected from the class consisting of pigment bonding agents and nitrogenous materials;
(III) said pigment bonding agent, being in an amount of from 0 to 100% by weight based on the inorganic pigment present and being selected from the group consisting of (i) water soluble alkali metal silicates precipitated in the presence of at least a part of the pigment composition, (ii) water soluble titanium compounds precipitated in the presence of at least a part of the pigment composition, (iii) water soluble and dispersible aminoplasts preformed and formed in situ and adhered to at least a part of the pigment composition, (iv) water soluble and dispersible phenoplasts preformed and formed in situ and adhered to at least a part of the pigment composition, (v) water soluble and dispersible organic polymers having carboxyl, amine, sulfate and sulfonic acid groups and salts thereof precipitated in the presence of at least a part of the pigment composition, and (vi) water soluble and dispersible organic silanes adhered to at least a part of the pigment composition; and
(IV) said nitrogenous material being in an amount of from 0 to 100% by weight, based on the inorganic pigment present, and being selected from the group consisting of (1) oleophilic amines, (ii) oleophilic imines, (ii) oleophilic amine carboxylates, (iv) the oleophilic quaternary ammonium compounds, (v) water soluble polyamines, (vi) water soluble imines, and (vii) combinations of two or more members of the foregoing.

* * * * *